US011151983B2

(12) United States Patent
Park et al.

(10) Patent No.: US 11,151,983 B2
(45) Date of Patent: Oct. 19, 2021

(54) BUILDING SYSTEM WITH AN ENTITY GRAPH STORING SOFTWARE LOGIC

(71) Applicant: Johnson Controls Technology Company, Auburn Hills, MI (US)

(72) Inventors: Youngchoon Park, Brookfield, WI (US); Sudhi R. Sinha, Milwaukee, WI (US); Vaidhyanathan Venkiteswaran, Brookfield, WI (US); Erik S. Paulson, Madison, WI (US); Vijaya S. Chennupati, Brookfield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 17/105,263

(22) Filed: Nov. 25, 2020

(65) Prior Publication Data

US 2021/0104229 A1 Apr. 8, 2021

Related U.S. Application Data

(63) Continuation of application No. 16/723,600, filed on Dec. 20, 2019, now Pat. No. 10,854,194, which is a
(Continued)

(51) Int. Cl.
  *G05B 15/00* (2006.01)
  *G10L 15/14* (2006.01)
  (Continued)

(52) U.S. Cl.
  CPC ............. *G10L 15/142* (2013.01); *G06F 3/01* (2013.01); *G06F 16/00* (2019.01); *G10L 15/14* (2013.01);
  (Continued)

(58) Field of Classification Search
  CPC ........ G06Q 10/06; G06Q 10/20; G05B 15/00; G06F 17/40
  See application file for complete search history.

(56) References Cited

U.S. PATENT DOCUMENTS

| 5,301,109 A | 4/1994 | Landauer et al. |
| 5,812,962 A | 9/1998 | Kovac |
| (Continued) | | |

FOREIGN PATENT DOCUMENTS

| CN | 106204392 A | 12/2016 |
| CN | 106406806 A | 2/2017 |
| (Continued) | | |

OTHER PUBLICATIONS

Balaji et al, "Brick: Towards a Unified Metadata Schema for Buildings," dated Nov. 16-17, 2016, 10 pages.
(Continued)

*Primary Examiner* — Daniel Abebe
(74) *Attorney, Agent, or Firm* — Foley & Lardner LLP

(57) ABSTRACT

One or more non-transitory computer readable media contain program instructions that, when executed, cause one or more processors to: receive first raw data including one or more first data points generated by a first object of a plurality of objects associated with one or more buildings; generate first input timeseries according to the one or more data points; access a database of interconnected smart entities, the smart entities including object entities representing each of the plurality of objects and data entities representing stored data, the smart entities being interconnected by relational objects indicating relationships between the smart entities; identify a first object entity representing the first object from a first identifier in the first input timeseries; identify a first data entity from a first relational object indicating a relationship between the first object entity and
(Continued)

the first data entity; and store the first input timeseries in the first data entity.

21 Claims, 13 Drawing Sheets

Related U.S. Application Data continuation of application No. 16/143,423, filed on Sep. 26, 2018, which is a continuation-in-part of application No. 15/644,519, filed on Jul. 7, 2017, now Pat. No. 10,095,756, and a continuation-in-part of application No. 15/644,560, filed on Jul. 7, 2017, now Pat. No. 10,417,245, and a continuation-in-part of application No. 15/644,581, filed on Jul. 7, 2017, now Pat. No. 10,169,486.

(60) Provisional application No. 62/564,247, filed on Sep. 27, 2017, provisional application No. 62/611,974, filed on Dec. 29, 2017, provisional application No. 62/611,984, filed on Dec. 29, 2017, provisional application No. 62/457,654, filed on Feb. 10, 2017.

(51) Int. Cl.
*G10L 25/63* (2013.01)
*G10L 15/30* (2013.01)
*G10L 15/22* (2006.01)
*G06F 3/01* (2006.01)
*G06F 16/00* (2019.01)

(52) U.S. Cl.
CPC .............. *G10L 15/22* (2013.01); *G10L 15/30* (2013.01); *G10L 25/63* (2013.01)

(56) References Cited

U.S. PATENT DOCUMENTS

| | | |
|---|---|---|
| 6,487,457 B1 | 11/2002 | Hull et al. |
| 6,493,755 B1 | 12/2002 | Hansen et al. |
| 6,816,811 B2 * | 11/2004 | Seem .................. G06F 17/18 702/179 |
| 6,986,138 B1 | 1/2006 | Sakaguchi et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,996,488 B1 | 8/2011 | Casabella et al. |
| 8,078,330 B2 | 12/2011 | Brickfield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,753,455 B2 | 9/2017 | Drees |
| 9,811,249 B2 | 11/2017 | Chen et al. |
| 9,886,478 B2 | 2/2018 | Mukherjee |
| 9,948,359 B2 | 4/2018 | Horton |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,389,742 B2 | 8/2019 | Reddy et al. |
| 10,536,295 B2 | 1/2020 | Fairweather et al. |
| 10,630,706 B2 | 4/2020 | Reddy et al. |
| 10,798,175 B1 | 10/2020 | Knight et al. |
| 2002/0016639 A1 | 2/2002 | Smith et al. |
| 2003/0171851 A1 | 9/2003 | Brickfield et al. |
| 2003/0200059 A1 | 10/2003 | Ignatowski et al. |
| 2004/0128314 A1 | 7/2004 | Katibah et al. |
| 2005/0055308 A1 | 3/2005 | Meyer et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0261062 A1 | 11/2007 | Bansal et al. |
| 2007/0273497 A1 | 11/2007 | Kuroda et al. |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0131533 A1 | 5/2010 | Ortiz |
| 2010/0274366 A1 * | 10/2010 | Fata .................. G06F 11/3048 700/7 |
| 2010/0281387 A1 | 11/2010 | Holland et al. |
| 2010/0324962 A1 * | 12/2010 | Nesler ................ G06Q 30/0206 705/7.36 |
| 2011/0015802 A1 | 1/2011 | Imes |
| 2011/0047418 A1 | 2/2011 | Drees et al. |
| 2011/0061015 A1 * | 3/2011 | Drees .................. G05B 15/02 715/771 |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0178977 A1 * | 7/2011 | Drees .................. G06Q 10/04 706/52 |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0064923 A1 | 3/2012 | Imes et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0278051 A1 | 11/2012 | Jiang et al. |
| 2013/0007063 A1 | 1/2013 | Kalra et al. |

(56) References Cited

U.S. PATENT DOCUMENTS

| | | |
|---|---|---|
| 2013/0038430 A1 | 2/2013 | Blower et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0204836 A1 | 8/2013 | Choi et al. |
| 2013/0247205 A1 | 9/2013 | Schrecker et al. |
| 2013/0275174 A1 | 10/2013 | Bennett et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0081652 A1 | 3/2014 | Klindworth |
| 2014/0135952 A1 | 5/2014 | Maehara |
| 2014/0172184 A1 | 6/2014 | Schmidt et al. |
| 2014/0189861 A1 | 7/2014 | Gupta et al. |
| 2014/0205155 A1 | 7/2014 | Chung et al. |
| 2014/0207282 A1 | 7/2014 | Angle et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0204563 A1 | 7/2015 | Imes et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0312696 A1 | 10/2015 | Ribbich et al. |
| 2015/0316918 A1 | 11/2015 | Schleiss et al. |
| 2015/0341212 A1 | 11/2015 | Hsiao et al. |
| 2015/0348417 A1 | 12/2015 | Ignaczak et al. |
| 2015/0356419 A1 | 12/2015 | Shircliff et al. |
| 2016/0033946 A1 | 2/2016 | Zhu et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0119434 A1 | 4/2016 | Dong et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0277374 A1 | 9/2016 | Reid et al. |
| 2016/0313751 A1 | 10/2016 | Risbeck et al. |
| 2016/0313752 A1 | 10/2016 | Przybylski |
| 2016/0350364 A1 | 12/2016 | Anicic et al. |
| 2016/0358432 A1 | 12/2016 | Branscomb et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0118236 A1 | 4/2017 | Reddy et al. |
| 2017/0118237 A1 | 4/2017 | Reddy et al. |
| 2017/0118240 A1 | 4/2017 | Reddy et al. |
| 2017/0123389 A1 | 5/2017 | Baez et al. |
| 2017/0134415 A1 | 5/2017 | Muddu et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0235817 A1 | 8/2017 | Deodhar et al. |
| 2017/0251182 A1 | 8/2017 | Siminoff et al. |
| 2017/0277769 A1 | 9/2017 | Pasupathy et al. |
| 2017/0278003 A1 | 9/2017 | Liu |
| 2017/0315522 A1 | 11/2017 | Kwon et al. |
| 2017/0315697 A1 | 11/2017 | Jacobson et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357607 A1 | 12/2017 | Cayemberg et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0039238 A1 | 2/2018 | Gartner et al. |
| 2018/0069932 A1 | 3/2018 | Tiwari et al. |
| 2018/0114140 A1 | 4/2018 | Chen et al. |
| 2018/0119975 A1 | 5/2018 | Park et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0203961 A1 | 7/2018 | Aisu et al. |
| 2018/0232422 A1 | 8/2018 | Park et al. |
| 2018/0232423 A1 | 8/2018 | Park et al. |
| 2018/0232459 A1 | 8/2018 | Park et al. |
| 2018/0239982 A1 | 8/2018 | Rutschman et al. |
| 2018/0276962 A1 | 9/2018 | Butler et al. |
| 2018/0292797 A1 | 10/2018 | Lamparter et al. |
| 2018/0309818 A1 | 10/2018 | Park et al. |
| 2018/0336785 A1 | 11/2018 | Ghannam et al. |
| 2018/0359111 A1 | 12/2018 | Harvey |
| 2019/0005025 A1 | 1/2019 | Malabarba |
| 2019/0037135 A1 | 1/2019 | Hedge |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0138512 A1 | 5/2019 | Pourmohammad et al. |
| 2019/0268178 A1 | 8/2019 | Fairweather et al. |
| 2019/0310979 A1 | 10/2019 | Masuzaki et al. |
| 2020/0285203 A1 | 9/2020 | Thakur et al. |
| 2021/0042299 A1 | 2/2021 | Migliori |

FOREIGN PATENT DOCUMENTS

| | | |
|---|---|---|
| CN | 106960269 A | 7/2017 |
| CN | 107147639 A1 | 9/2017 |
| CN | 107598928 A | 1/2018 |
| JP | 2008-107930 A | 5/2008 |
| KR | 2016/0102923 A | 8/2016 |
| WO | WO-2009/020158 A1 | 2/2009 |
| WO | WO-2011/100255 A2 | 8/2011 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |

(56) References Cited

FOREIGN PATENT DOCUMENTS

OTHER PUBLICATIONS

Balaji et al, Brick: Metadata schema for portable smart building applications, dated Sep. 25, 2017, 20 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, The Bad and The Ugly, ACM, dated Nov. 4-5, 2015, 4 pages.
Brick: Metadata schema for portable smart building applications, dated Sep. 15, 2018, 3 pages, (Abstract).
Brick: Towards a Unified Metadata Schema for Buildings, dated Nov. 16, 2016, 46 pages.
Building Blocks for Smart Buildings, BrickSchema.org, dated Mar. 2019, 17 pages.
Extended European Search Report issued in EP Application No. 18196948.6 dated Apr. 10, 2019, 9 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.
International Search Report and Written Opinion for PCT/US2017/013831, dated Mar. 31, 2017, 14 pages.
International Search Report and Written Opinion for PCT/US2017/035524, dated Jul. 24, 2017, 14 pages.
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Li et al., Event Stream Processing with Out-of-Order Data Arrival, International Conferences on Distributed Computing Systems, 2007, 8 pages.
Metadata Schema for Buildings, Brickschema.org, Retrieved Dec. 24, 2019, 3 pages.
Results of the Partial International Search for PCT/US2018/052971, dated Jan. 3, 2019, 3 pages.
Scrabble: Transferrable Semi-Automated Semantic Metadata Normalization using Intermediate Representation, dated Nov. 7-8, 2018, 10 pages.
Wei et al., "Development and Implementation of Software Gateways of Fire Fighting Subsystem Running on EBI," Control, Automation and Systems Engineering, IITA International Conference on, IEEE, Jul. 2009, pp. 9-12.

\* cited by examiner

BUILDING SYSTEM WITH AN ENTITY GRAPH STORING SOFTWARE LOGIC

CROSS-REFERENCE TO RELATED APPLICATIONS

This application is a continuation of U.S. patent application Ser. No. 16/723,600 filed Dec. 20, 2019 which is a continuation of U.S. patent application Ser. No. 16/143,423 filed Sep. 26, 2018 which claims the benefit of and priority to U.S. Provisional Patent Application No. 62/564,247 filed Sep. 27, 2017, U.S. Provisional Patent Application No. 62/611,974 filed Dec. 29, 2017, and U.S. Provisional Patent Application No. 62/611,984 filed Dec. 29, 2017. U.S. patent application Ser. No. 16/143,423 filed Sep. 26, 2018 is a continuation-in-part of U.S. patent application Ser. No. 15/644,519 filed Jul. 7, 2017, which claims the benefit of and priority to U.S. Provisional Patent Application No. 62/457,654 filed Feb. 10, 2017. U.S. patent application Ser. No. 16/143,423 filed Sep. 26, 2018 is also a continuation-in-part of U.S. patent application Ser. No. 15/644,581 filed Jul. 7, 2017, which claims the benefit of and priority to U.S. Provisional Patent Application No. 62/457,654 filed Feb. 10, 2017. U.S. patent application Ser. No. 16/143,423 filed Sep. 26, 2018 is also a continuation-in-part of U.S. patent application Ser. No. 15/644,560 filed Jul. 7, 2017, which claims the benefit of and priority to U.S. Provisional Patent Application No. 62/457,654 filed Feb. 10, 2017. The entire disclosure of each of these patent applications is incorporated by reference herein.

BACKGROUND

The present disclosure relates generally to the field of a building management platform that is communicatively connected to one or more building management systems in a smart building environment. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

A BMS can collect data from objects associated with a building, such as other BMSs, building subsystems, devices, sensors and other types of building equipment. Building management platforms are utilized to register and manage the objects, gather and analyze data produced by the objects, and provide recommendations or results based on the collected data. As the number of buildings transitioning to a smart building environment increases, the amount of data being produced and collected has been increasing exponentially. Accordingly, effective analysis of a plethora of collected data is desired.

SUMMARY

One implementation of the present disclosure is a building management cloud computing system for managing timeseries data relating to a plurality of objects associated with one or more buildings. The plurality of objects each represent a space, a person, building subsystem, and/or device. The plurality of objects are connected to one or more electronic communications networks. The system includes one or more processors and one or more computer-readable storage media. The one or more processors are communicably coupled to a database of interconnected smart entities, the smart entities including object entities representing each of the plurality of objects and data entities representing stored data, the smart entities being interconnected by relational objects indicating relationships between the object entities and the data entities. The one or more computer-readable store media are communicably coupled to the one or more processors and have instructions stored thereon. When executed by the one or more processors, the instructions cause the one or more processors to receive first raw data from a first object of the plurality of objects. The first raw data includes one or more first data points generated by the first object. The instructions when executed cause the one or more processors to generate first input timeseries according to the one or more data points, identify a first object entity representing the first object from a first identifier in the first input timeseries, identify a first data entity from a first relational object indicating a relationship between the first object entity and the first data entity, and store the first input timeseries in the first data entity.

In some embodiments, the relational objects may semantically define the relationships between the object entities and the data entities.

In some embodiments, one or more of the object entities may include a static attribute to identify the object entity, a dynamic attribute to store data associated with the object entity that changes over time, and a behavioral attribute that defines an expected response of the object entity in response to an input.

In some embodiments, the first input timeseries may correspond to the dynamic attribute of the first object entity.

In some embodiments, at least one of the first data points in the first input timeseries may be stored in the dynamic attribute of the first object entity.

In some embodiments, the input timeseries may include the first identifier, a timestamp indicating a generation time of the one or more first data points, and a value of the one or more first data points.

In some embodiments, the instructions may further cause the one or more processors to identify a second object entity representing a second object from a second relational object indicating a relationship between the first object entity and the second object entity, and identify a second data entity from a third relational object indicating a relationship between the second object entity and the second data entity. The second data entity may store second input timeseries corresponding to one or more second data points associated with the second object.

In some embodiments, the instructions may further cause the one or more processors to identify one or more processing workflows that defines one or more processing operations to generate derived timeseries using the first and second input timeseries, execute the one or more processing workflows to generate the derived timeseries, identify a third data entity from a fourth relational object indicating a relationship between the second object entity and the third data entity, and store the derived timeseries in the third data entity.

In some embodiments, the first object may be an access control device and the second object may be an access keycard associated with a person.

In some embodiments, the derived timeseries may include one or more virtual data points calculated according to the first and second input timeseries.

In some embodiments, the one or more virtual data points may include one or more location attributes of the person.

In some embodiments, the first object may be a temperature sensor and the second object may be a variable air volume unit (VAV).

In some embodiments, the derived timeseries may include an abnormal temperature attribute corresponding to a space in which the temperature sensor is located and which the VAV is configured to serve.

In some embodiments, at least one of the first or second objects may be a temperature sensor.

In some embodiments, the instructions may further cause the one or more processors to periodically receive temperature measurements from the temperature sensor, and update at least the derived timeseries in the third data entity each time a new temperature measurement from the temperature sensor is received.

In some embodiments, the derived timeseries may include an average ambient temperature of a space in which the temperature sensor is located.

In some embodiments, the instructions may further cause the one or more processors to create a shadow entity to store historical values of the first raw data.

In some embodiments, the instructions may further cause the one or more processors to calculate a virtual data point from the historical values, and create a fourth data entity to store the virtual data point.

Another implementation of the present disclosure is a method for managing timeseries data relating to a plurality of objects associated with one or more buildings. The plurality of objects each represent a space, person, building system, and/or device. The plurality of objects are connected to one or more electronic communications networks. The method includes receiving first raw data from a first object of the plurality of objects. The first raw data includes one or more first data points generated by the first object. The method includes generating first input timeseries according to the one or more data points, and accessing a database of interconnected smart entities. The smart entities include object entities representing each of the plurality of objects and data entities representing stored data, the smart entities being interconnected by relational objects indicating relationships between the object entities and the data entities. The method includes identifying a first object entity representing the first object from a first identifier in the first input timeseries, identifying a first data entity from a first relational object indicating a relationship between the first object entity and the first data entity, and storing the first input timeseries in the first data entity.

In some embodiments, the relational objects may semantically define the relationships between the object entities and the data entities.

In some embodiments, one or more of the object entities may include a static attribute to identify the object entity, a dynamic attribute to store data associated with the object entity that changes over time, and a behavioral attribute that defines an expected response of the object entity in response to an input.

In some embodiments, the first input timeseries may correspond to the dynamic attribute of the first object entity.

In some embodiments, at least one of the first data points in the first input timeseries may be stored in the dynamic attribute of the first object entity.

In some embodiments, the input timeseries may include the first identifier, a timestamp indicating a generation time of the one or more first data points, and a value of the one or more first data points.

In some embodiments, the method may further include identifying a second object entity representing a second object from a second relational object indicating a relationship between the first object entity and the second object entity, and identifying a second data entity from a third relational object indicating a relationship between the second object entity and the second data entity. The second data entity may store second input timeseries corresponding to one or more second data points associated with the second object.

In some embodiments, the method may further include identifying one or more processing workflows that defines one or more processing operations to generate derived timeseries using the first and second input timeseries, executing the one or more processing workflows to generate the derived timeseries, identifying a third data entity from a fourth relational object indicating a relationship between the second object entity and the third data entity, and storing the derived timeseries in the third data entity.

In some embodiments, the first object may be an access control device and the second object may be an access keycard associated with a person.

In some embodiments, the derived timeseries may include one or more virtual data points calculated according to the first and second input timeseries.

In some embodiments, the one or more virtual data points may include one or more location attributes of the person.

In some embodiments, the first object may be a temperature sensor and the second object may be a variable air volume unit (VAV).

In some embodiments, the derived timeseries may include an abnormal temperature attribute corresponding to a space in which the temperature sensor is located and which the VAV is configured to serve.

In some embodiments, at least one of the first or second objects may be a temperature sensor.

In some embodiments, the method may further include periodically receiving temperature measurements from the temperature sensor, and updating at least the derived timeseries in the third data entity each time a new temperature measurement from the temperature sensor is received.

In some embodiments, the derived timeseries may include an average ambient temperature of a space in which the temperature sensor is located.

In some embodiments, the method may further include creating a shadow entity to store historical values of the first raw data.

In some embodiments, the method may further include calculating a virtual data point from the historical values, and creating a fourth data entity to store the virtual data point.

Another implementation of the present disclosure is one or more non-transitory computer readable media containing program instructions. When executed by one or more processors, the instructions cause the one or more processors to perform operations including receiving first raw data from a first object of a plurality of objects associated with one or more buildings. The plurality of objects each represent a space, person, building subsystem, and/or device. The first raw data includes one or more first data points generated by the first object. The method includes generating first input timeseries according to the one or more data points, and accessing a database of interconnected smart entities. The smart entities include object entities representing each of the plurality of objects and data entities representing stored data, the smart entities being interconnected by relational objects indicating relationships between the object entities and the data entities. The method includes identifying a first object entity representing the first object from a first identifier in the first input timeseries, identifying a first data entity from a first relational object indicating a relationship between the first object entity and the first data entity, and storing the first input timeseries in the first data entity.

In some embodiments, the relational objects may semantically define the relationships between the object entities and the data entities.

In some embodiments, one or more of the object entities may include a static attribute to identify the object entity, a dynamic attribute to store data associated with the object entity that changes over time, and a behavioral attribute that defines an expected response of the object entity in response to an input.

In some embodiments, the first input timeseries may correspond to the dynamic attribute of the first object entity.

In some embodiments, at least one of the first data points in the first input timeseries may be stored in the dynamic attribute of the first object entity.

In some embodiments, the input timeseries may include the first identifier, a timestamp indicating a generation time of the one or more first data points, and a value of the one or more first data points.

In some embodiments, the instructions may further cause the one or more processors to identify a second object entity representing a second object from a second relational object indicating a relationship between the first object entity and the second object entity, and identify a second data entity from a third relational object indicating a relationship between the second object entity and the second data entity. The second data entity may store second input timeseries corresponding to one or more second data points associated with the second object.

In some embodiments, the program instructions may further cause the one or more processors to identify one or more processing workflows that defines one or more processing operations to generate derived timeseries using the first and second input timeseries, execute the one or more processing workflows to generate the derived timeseries, identify a third data entity from a fourth relational object indicating a relationship between the second object entity and the third data entity, and store the derived timeseries in the third data entity.

In some embodiments, the first object may be an access control device and the second object may be an access keycard associated with a person.

In some embodiments, the derived timeseries may include one or more virtual data points calculated according to the first and second input timeseries.

In some embodiments, the one or more virtual data points may include one or more location attributes of the person.

In some embodiments, the first object may be a temperature sensor and the second object may be a variable air volume unit (VAV).

In some embodiments, the derived timeseries may include an abnormal temperature attribute corresponding to a space in which the temperature sensor is located and which the VAV is configured to serve.

In some embodiments, at least one of the first or second objects may be a temperature sensor.

In some embodiments, the instructions may cause the one or more processors to periodically receive temperature measurements from the temperature sensor, and update at least the derived timeseries in the third data entity each time a new temperature measurement from the temperature sensor is received.

In some embodiments, the derived timeseries may include an average ambient temperature of a space in which the temperature sensor is located.

In some embodiments, the instructions may further cause the one or more processors to create a shadow entity to store historical values of the first raw data.

In some embodiments, the instructions may further cause the one or more processors to calculate a virtual data point from the historical values, and create a fourth data entity to store the virtual data point.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Hereinafter, example embodiments will be described in more detail with reference to the accompanying drawings.

Figure 1:
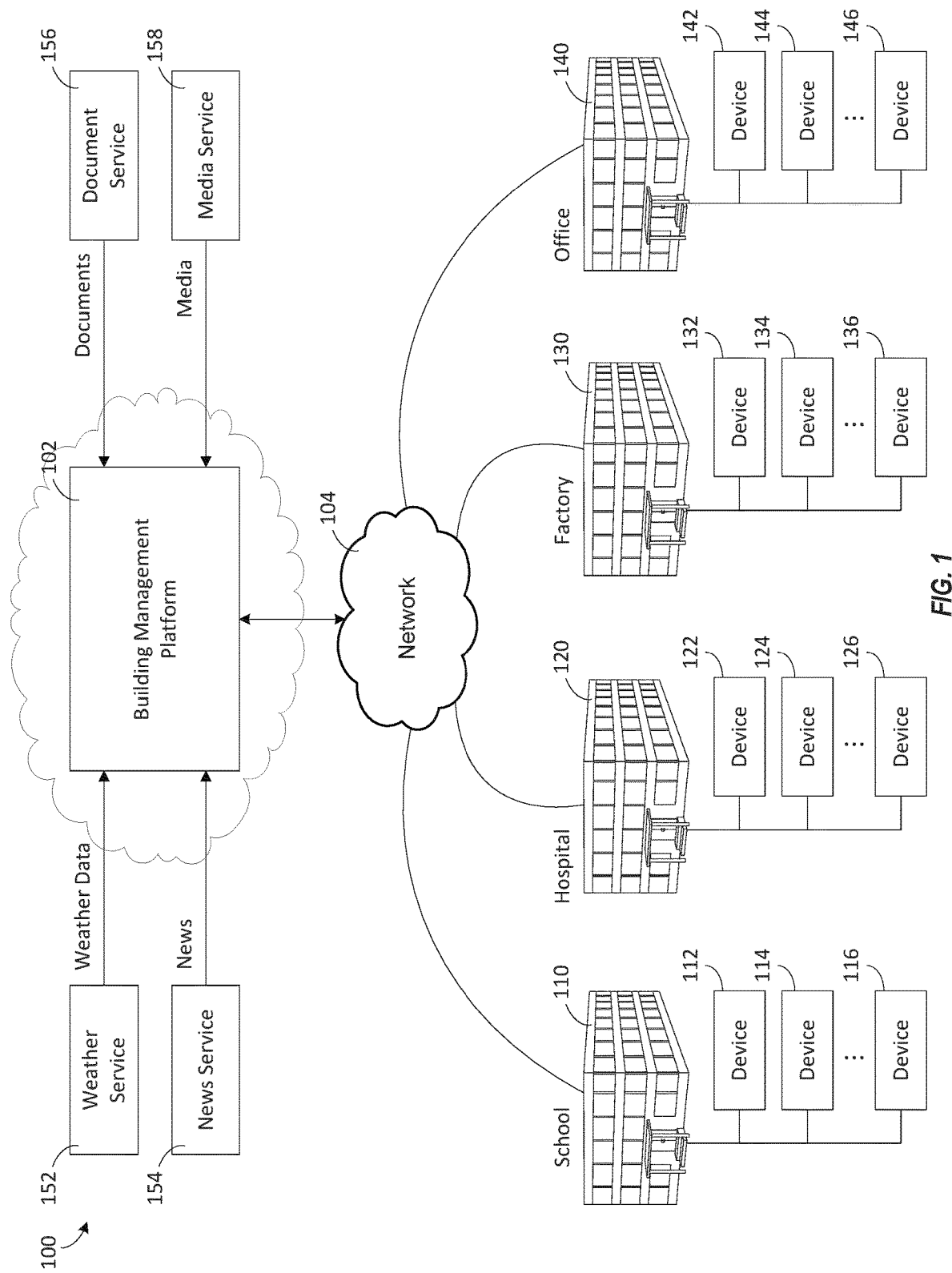
FIG. 1 is a block diagram of a smart building environment, according to some exemplary embodiments.

FIG. 1 is a block diagram of a smart building environment 100, according to some exemplary embodiments. Smart building environment 100 is shown to include a building management platform 102. Building management platform 102 can be configured to collect data from a variety of different data sources. For example, building management platform 102 is shown collecting data from buildings 110, 120, 130, and 140. For example, the buildings may include a school 110, a hospital 120, a factory 130, an office building 140, and/or the like. However the present disclosure is not limited to the number or types of buildings 110, 120, 130, and 140 shown in FIG. 1. For example, in some embodiments, building management platform 102 may be configured to collect data from one or more buildings, and the one or more buildings may be the same type of building, or may include one or more different types of buildings than that shown in FIG. 1.

Building management platform 102 can be configured to collect data from a variety of devices 112-116, 122-126, 132-136, and 142-146, either directly (e.g., directly via network 104) or indirectly (e.g., via systems or applications in the buildings 110, 120, 130, 140). In some embodiments, devices 112-116, 122-126, 132-136, and 142-146 are internet of things (IoT) devices. IoT devices may include any of a variety of physical devices, sensors, actuators, electronics, vehicles, home appliances, and/or other items having network connectivity which enable IoT devices to communicate with building management platform 102. For example, IoT devices can include smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

In some embodiments, IoT devices may include sensors or sensor systems. For example, IoT devices may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio meters, AFR sensors, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Wexamples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, LIDAR sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, CMOS sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to building management platform 102 using a variety of different communications protocols or data formats. Building management platform 102 can be configured to ingest sensor data received in any protocol or data format and translate the inbound sensor data into a common data format. Building management platform 102 can create a sensor object smart entity for each sensor that communicates with Building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, building management platform 102 stores sensor data using data entities. Each data entity may correspond to a particular sensor and may include a timeseries of data values received from the corresponding sensor. In some embodiments, building management platform 102 stores relational objects that define relationships between sensor object entities and the corresponding data entity. For example, each relational object may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document-related data from a document service 156, and media (e.g., video, images, audio, social media, etc.) from a media service 158. In some embodiments, building management platform 102 generates data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the Internet, a cellular network, etc.). Building management platform 102 can process and transform collected data to generate timeseries data and entity data. Several features of building management platform 102 are described in more detail below.

Building HVAC Systems and Building Management Systems

Figure 2:
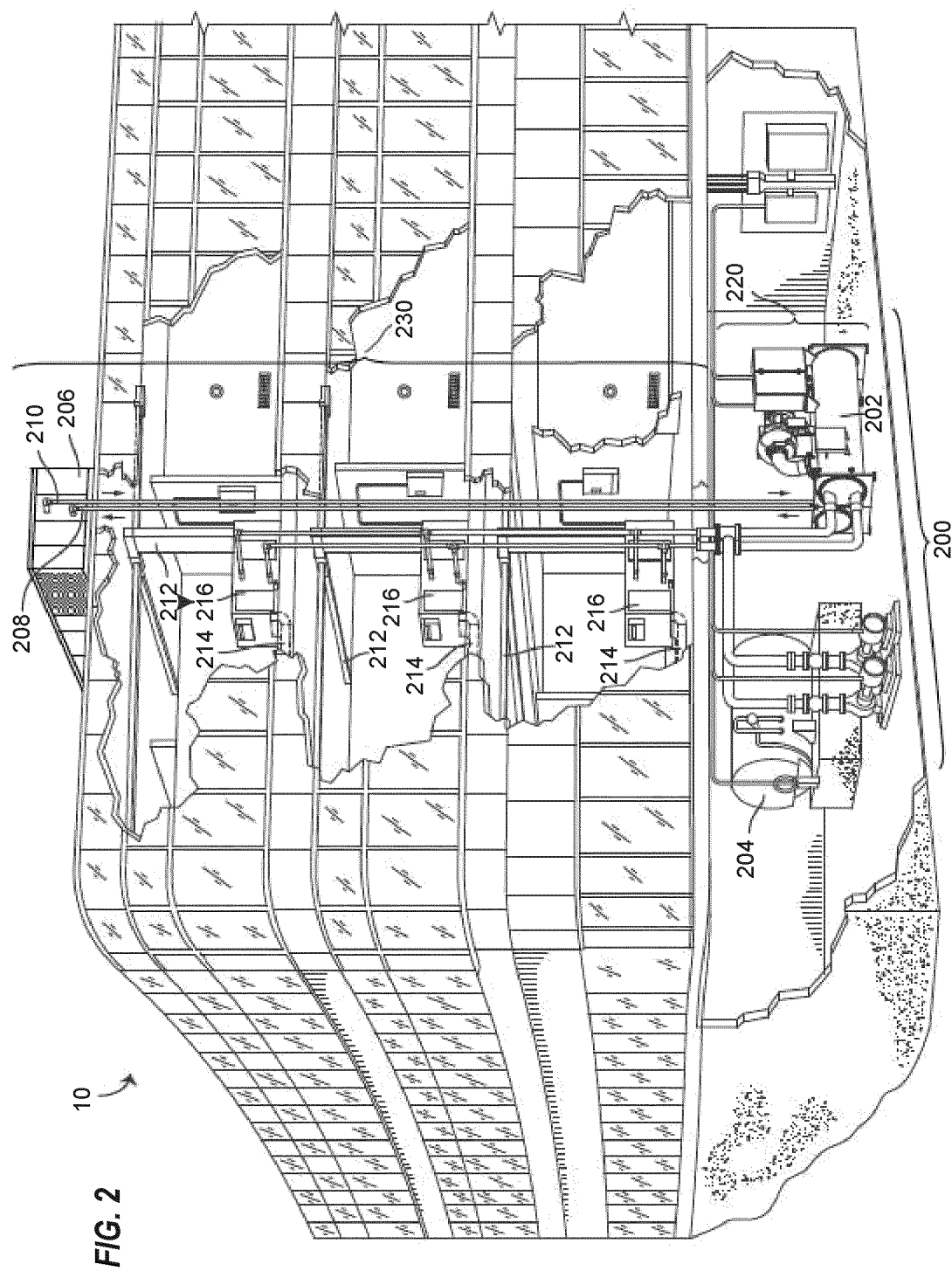
FIG. 2 is a perspective view of a smart building, according to some exemplary embodiments.
Figure 3:
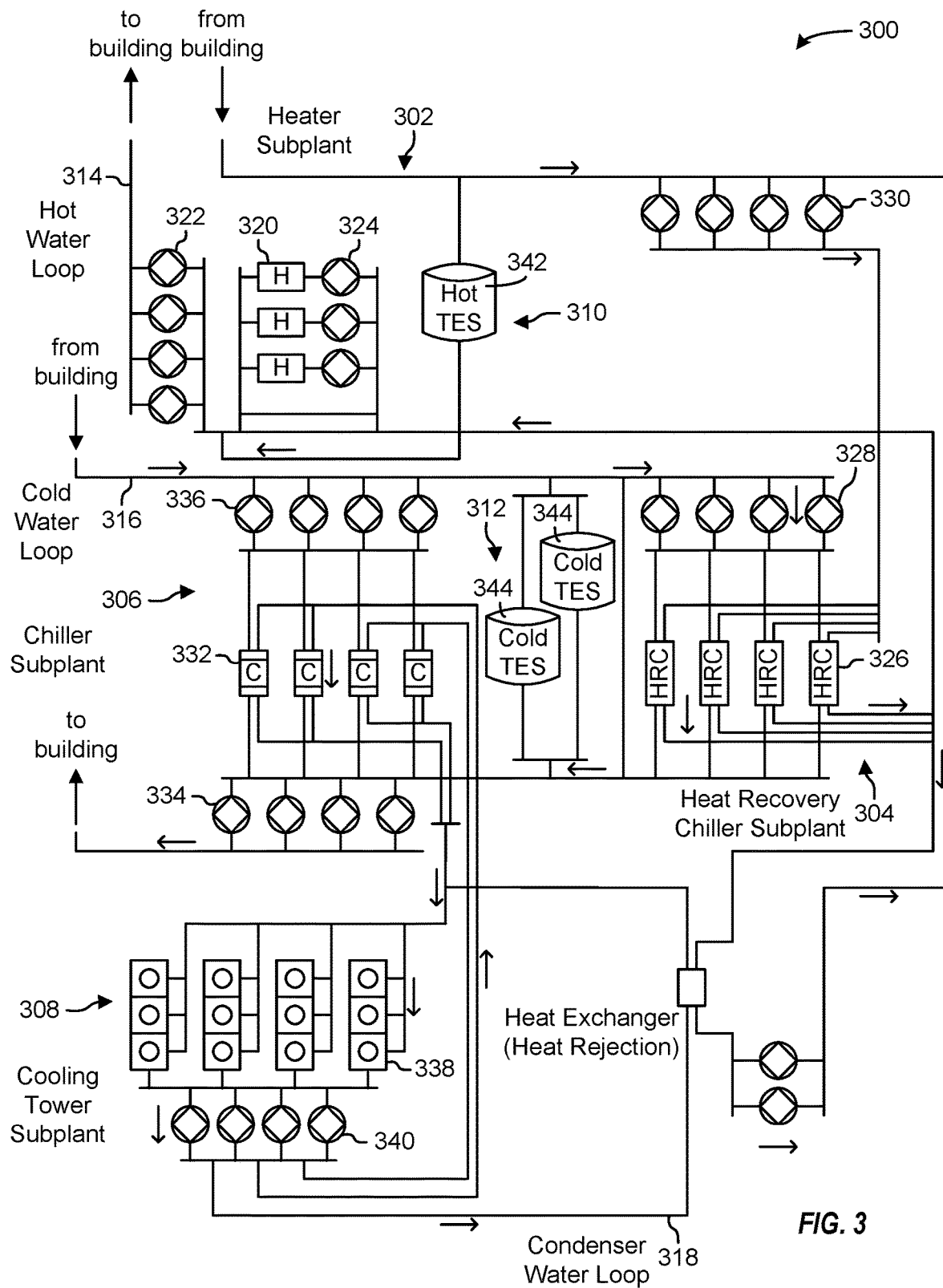
FIG. 3 is a block diagram of a waterside system, according to some exemplary embodiments.
Figure 4:
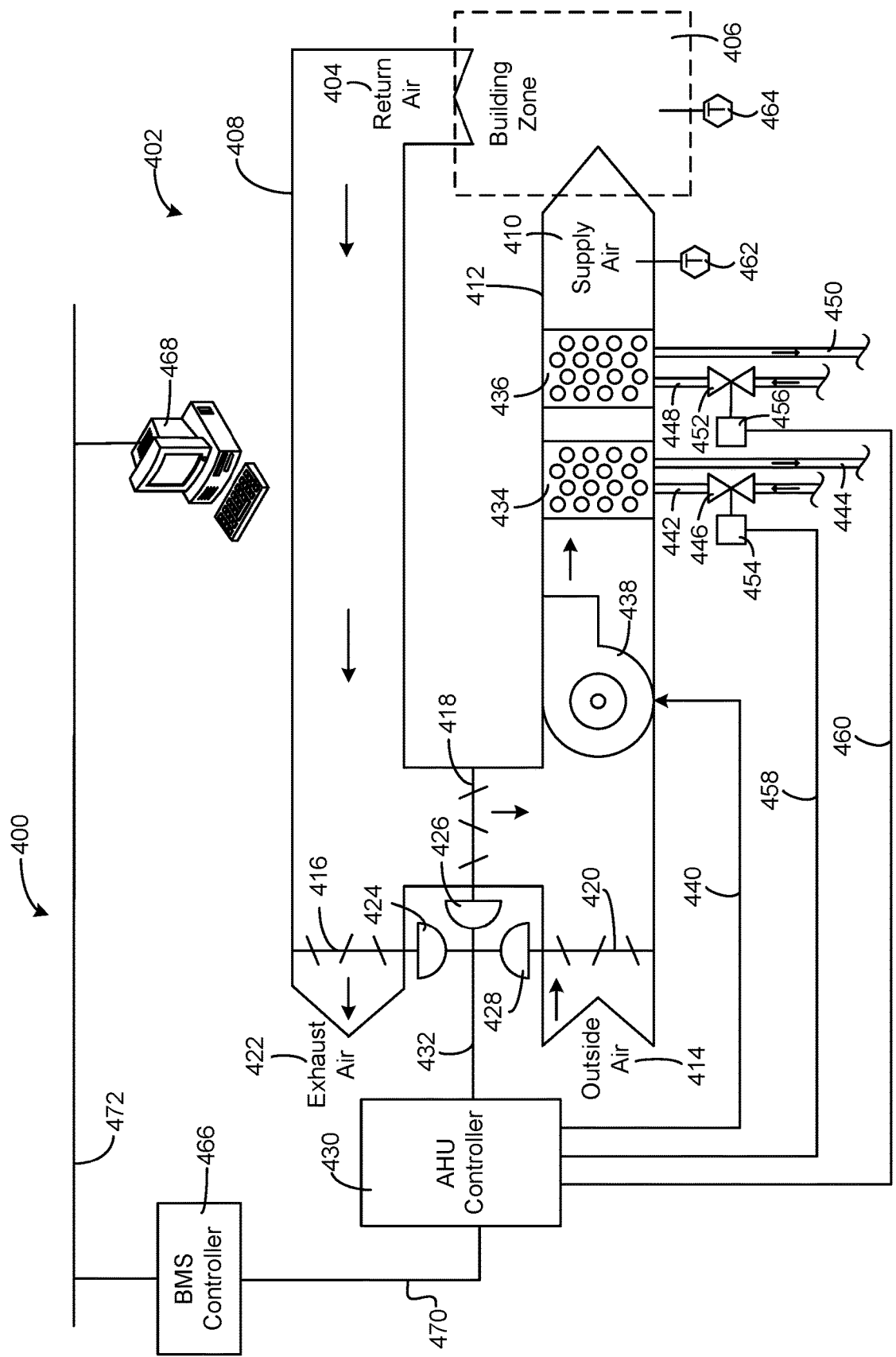
FIG. 4 is a block diagram of an airside system, according to some exemplary embodiments.
Figure 5:
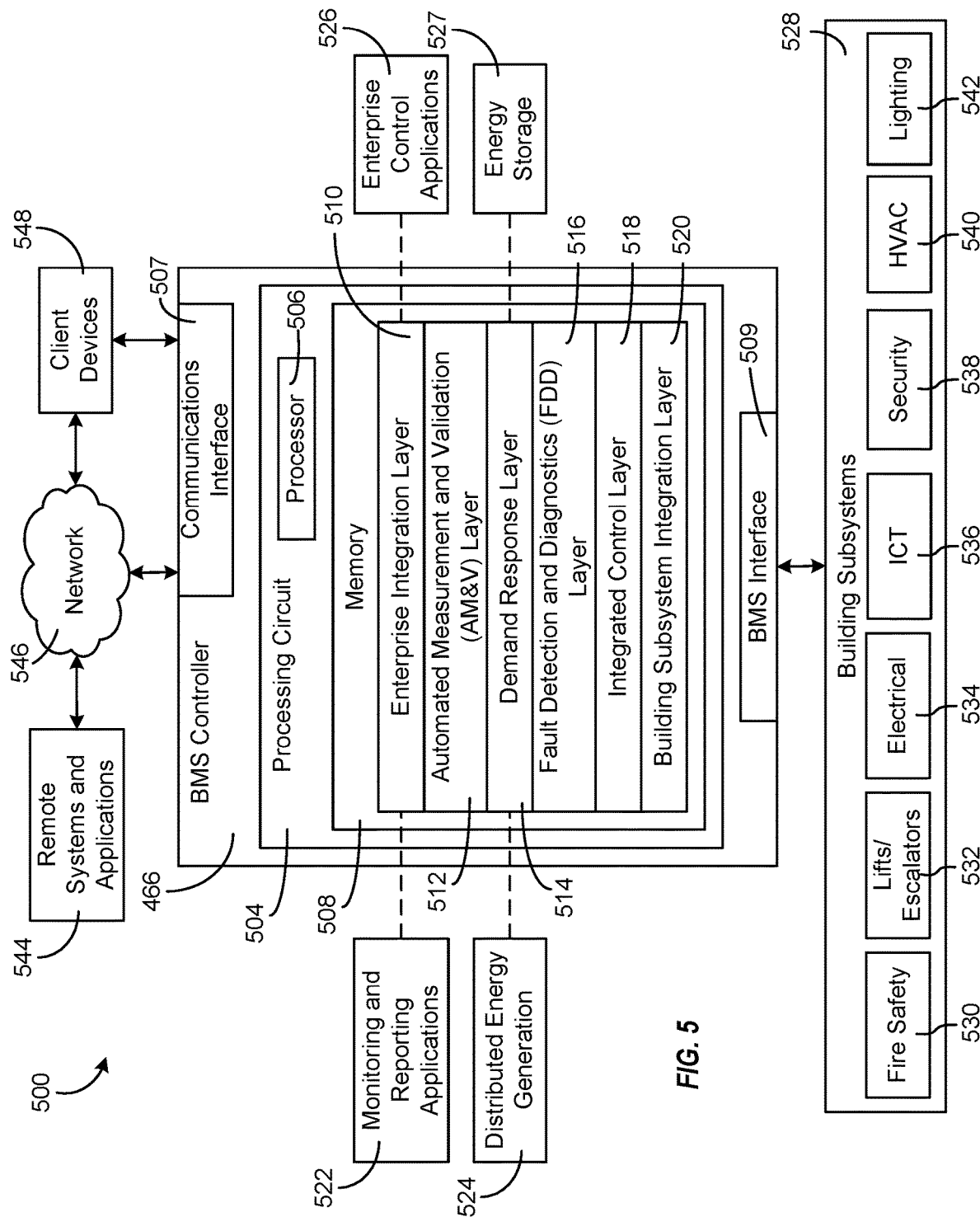
FIG. 5 is a block diagram of a building management system, according to some exemplary embodiments.

Referring now to FIGS. 2-5, several building management systems (BMS) and HVAC systems in which the systems and methods of the present disclosure can be implemented are shown, according to some embodiments. In brief overview, FIG. 2 shows a building 10 equipped with, for example, a HVAC system 200. Building 10 may be any of the buildings 210, 220, 230, and 140 as shown in FIG. 1, or may be any other suitable building that is communicatively connected to building management platform 202. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Building and HVAC System

Referring particularly to FIG. 2, a perspective view of a smart building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. Further, each of the systems may include a plurality of sensors and other devices (e.g., IoT devices) for the proper operation, maintenance, monitoring, and the like of the respective systems.

The BMS that serves building 10 includes a HVAC system 200. HVAC system 200 can include a plurality of HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Referring now to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200, waterside system 300 can include a subset of the HVAC devices in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having a plurality of subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplants 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include a plurality of heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include a plurality of chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include a plurality of heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include a plurality of cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or non-mobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and a plurality of building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Interface 507 may facilitate communications between BMS controller 466 and external applications (e.g., monitoring and reporting applications 522, enterprise control applications 526, remote systems and applications 544, applications residing on client devices 548, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments BMS controller 466 can be distributed across multiple servers or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine optimal control actions for building subsystems 528 based on the inputs, generate control signals based on the optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across a plurality of multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated supersystem. In some embodiments, integrated control layer 518 includes control logic that uses inputs and outputs from a plurality of building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Building Management System with Cloud Building Management Platform

Figure 6:
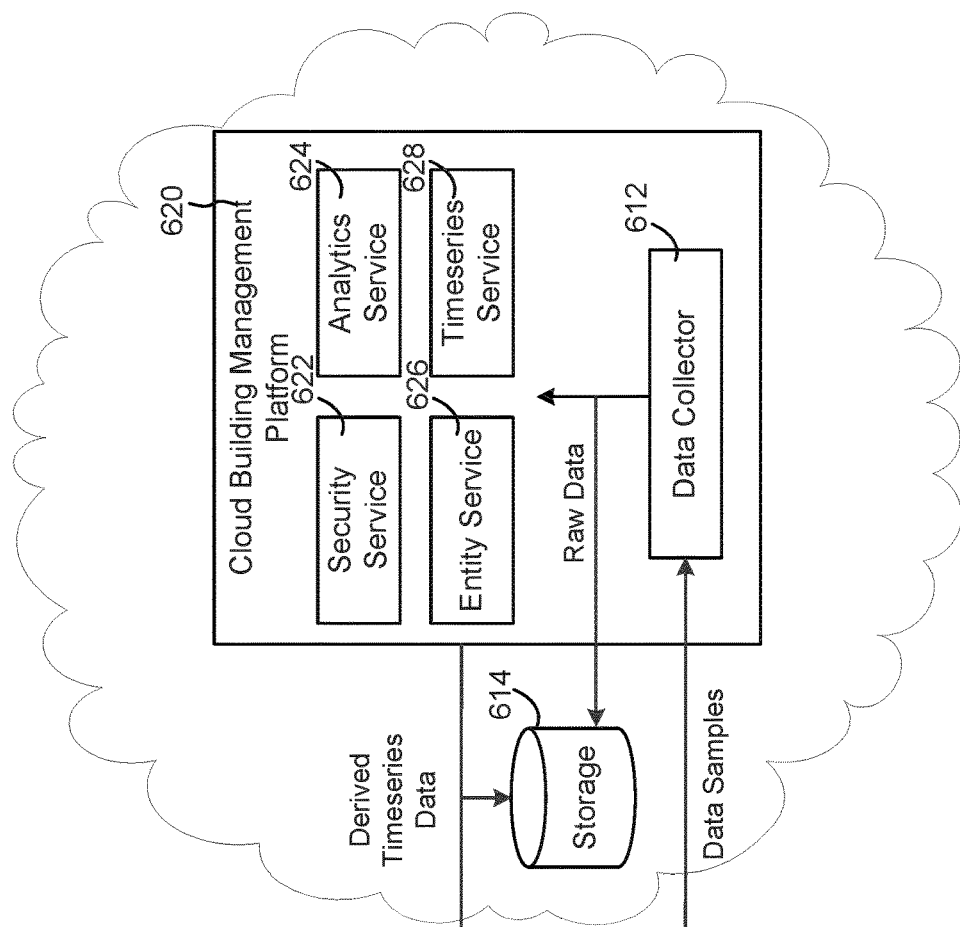
FIG. 6 is a block diagram of another building management system, according to some exemplary embodiments.
Figure 6:
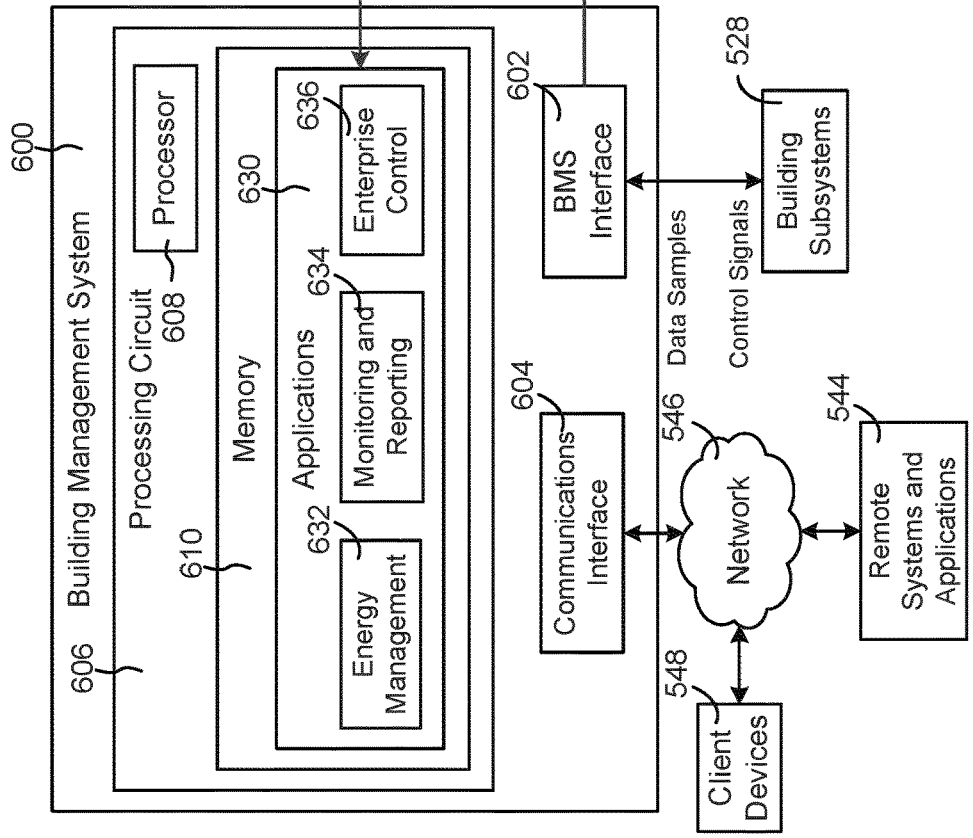

Referring now to FIG. 6, a block diagram of another building management system (BMS) 600 is shown, according to some embodiments. BMS 600 can be configured to collect data samples from building subsystems 528 and provide the data samples to Cloud building management platform 620 to generate raw timeseries data, derived timeseries data, and/or entity data from the data samples. In some embodiments, Cloud building management platform 620 may supplement or replace building management platform 102 shown in FIG. 1 or can be implemented separate from building management platform 102. Cloud building management platform 620 can process and transform the raw timeseries data to generate derived timeseries data. Throughout this disclosure, the term "derived timeseries data" is used to describe the result or output of a transformation or other timeseries processing operation performed by various services of the building management platform 620 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 630 and/or stored in storage 614 (e.g., as materialized views of the raw timeseries data). In some embodiments, Cloud building management platform 620 separates data collection; data storage, retrieval, and analysis; and data visualization into three different layers. This allows Cloud building management platform 620 to support a variety of applications 630 that use the derived timeseries data and allows new applications 630 to reuse the existing infrastructure provided by Cloud building management platform 620.

It should be noted that the components of BMS 600 and/or Cloud building management platform 620 can be integrated within a single device (e.g., a supervisory controller, a BMS controller, etc.) or distributed across multiple separate systems or devices. In other embodiments, some or all of the components of BMS 600 and/or Cloud building management platform 620 can be implemented as part of a cloud-based computing system configured to receive and process data from one or more building management systems. In other embodiments, some or all of the components of BMS 600 and/or Cloud building management platform 620 can be components of a subsystem level controller (e.g., a HVAC controller), a subplant controller, a device controller (e.g., AHU controller 330, a chiller controller, etc.), a field controller, a computer workstation, a client device, or any other system or device that receives and processes data from building systems and equipment.

BMS 600 can include many of the same components as BMS 500, as described with reference to FIG. 5. For example, BMS 600 is shown to include a BMS interface 602 and a communications interface 604. Interfaces 602-604 can include wired or wireless communications interfaces (e.g., jacks, antennas, transmitters, receivers, transceivers, wire terminals, etc.) for conducting data communications with building subsystems 528 or other external systems or devices. Communications conducted via interfaces 602-604 can be direct (e.g., local wired or wireless communications) or via a communications network 546 (e.g., a WAN, the Internet, a cellular network, etc.).

Communications interface 604 can facilitate communications between BMS 600 and external applications (e.g., remote systems and applications 544) for allowing user control, monitoring, and adjustment to BMS 600. Communications interface 604 can also facilitate communications between BMS 600 and client devices 548. BMS interface 602 can facilitate communications between BMS 600 and building subsystems 528. BMS 600 can be configured to communicate with building subsystems 528 using any of a variety of building automation systems protocols (e.g., BACnet, Modbus, ADX, etc.). In some embodiments, BMS 600 receives data samples from building subsystems 528 and provides control signals to building subsystems 528 via BMS interface 602.

Building subsystems 528 can include building electrical subsystem 534, information communication technology (ICT) subsystem 536, security subsystem 538, HVAC subsystem 540, lighting subsystem 542, lift/escalators subsystem 532, and/or fire safety subsystem 530, as described with reference to FIG. 5. In various embodiments, building subsystems 528 can include fewer, additional, or alternative subsystems. For example, building subsystems 528 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4. Each of building subsystems 528 can include any number of devices, controllers, and connections for completing its individual functions and control activities. Building subsystems 528 can include building equipment (e.g., sensors, air handling units, chillers, pumps, valves, etc.) configured to monitor and control a building condition such as temperature, humidity, airflow, etc.

Still referring to FIG. 6, BMS 600 is shown to include a processing circuit 606 including a processor 608 and memory 610. Cloud building management platform may include one or more processing circuits including one or more processors and memory. Each of the processor can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

Memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processors via the processing circuits and can include computer code for executing (e.g., by processor 508) one or more processes described herein.

Still referring to FIG. 6, Cloud building management platform 620 is shown to include a data collector 612. Data collector 612 is shown receiving data samples from building subsystems 528 via BMS interface 602. However, the present disclosure is not limited thereto, and the data collector 612 may receive the data samples directly from the building subsystems 528 (e.g., via network 546 or via any suitable method). In some embodiments, the data samples include data values for various data points. The data values can be measured or calculated values, depending on the type of data point. For example, a data point received from a temperature sensor can include a measured data value indicating a temperature measured by the temperature sensor. A data point received from a chiller controller can include a calculated data value indicating a calculated efficiency of the chiller. Data collector 612 can receive data samples from multiple different devices (e.g., IoT devices, sensors, etc.) within building subsystems 528.

The data samples can include one or more attributes that describe or characterize the corresponding data points. For example, the data samples can include a name attribute defining a point name or ID (e.g., "B1F4R2.T-Z"), a device attribute indicating a type of device from which the data samples is received (e.g., temperature sensor, humidity sensor, chiller, etc.), a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to BMS 600 and/or Cloud building management platform 620. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 612 adds timestamps to the data samples based on the times at which the data samples are received. Data collector 612 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 612 is as follows:

[<key, timestamp$_1$, value$_1$>, <key, timestamp$_2$, value$_2$>, <key, timestamp$_3$, value$_3$>]

where key is an identifier of the source of the raw data samples (e.g., timeseries ID, sensor ID, device ID, etc.), timestamp identifies the time at which the ith sample was collected, and value$_i$ indicates the value of the ith sample.

Data collector 612 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 612 organizes the raw timeseries data. Data collector 612 can identify a system or device associated with each of the data points. For example, data collector 612 can associate a data point with a temperature sensor, an air handler, a chiller, or any other type of system or device. In some embodiments, a data entity may be created for the data point, in which case, the data collector 612 (e.g., via entity service) can associate the data point with the data entity. In various embodiments, data collector uses the name of the data point, a range of values of the data point, statistical characteristics of the data point, or other attributes of the data point to identify a particular system or device associated with the data point. Data collector 612 can then determine how that system or device relates to the other systems or devices in the building site from entity data. For example, data collector 612 can determine that the identified system or device is part of a larger system (e.g., a HVAC system) or serves a particular space (e.g., a particular building, a room or zone of the building, etc.) from the entity data. In some embodiments, data collector 512 uses or retrieves an entity graph (e.g., via entity service 626) when organizing the timeseries data.

Data collector 612 can provide the raw timeseries data to the services of Cloud building management platform 620 and/or store the raw timeseries data in storage 614. Storage 614 may be internal storage or external storage. For example, storage 614 can be internal storage with relation to Cloud building management platform 620 and/or BMS 600, and/or may include a remote database, cloud-based data hosting, or other remote data storage. Storage 614 can be configured to store the raw timeseries data obtained by data collector 612, the derived timeseries data generated by Cloud building management platform 620, and/or directed acyclic graphs (DAGs) used by Cloud building management platform 620 to process the timeseries data.

Still referring to FIG. 5, Cloud building management platform 620 can receive the raw timeseries data from data collector 612 and/or retrieve the raw timeseries data from storage 614. Cloud building management platform 620 can include a variety of services configured to analyze, process, and transform the raw timeseries data. For example, Cloud building management platform 620 is shown to include a security service 622, an analytics service 624, an entity service 626, and a timeseries service 628. Security service 622 can assign security attributes to the raw timeseries data to ensure that the timeseries data are only accessible to authorized individuals, systems, or applications. Security service 622 may include a messaging layer to exchange secure messages with the entity service 626. In some embodiment, security service 622 may provide permission data to entity service 626 so that entity service 626 can determine the types of entity data that can be accessed by a particular entity or device. Entity service 624 can assign entity information (or entity data) to the timeseries data to associate data points with a particular system, device, or space. Timeseries service 628 and analytics service 624 can apply various transformations, operations, or other functions to the raw timeseries data to generate derived timeseries data.

In some embodiments, timeseries service 628 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 628 provide an efficient mechanism for applications 630 to query the timeseries data. For example, applications 630 can construct visualizations of the timeseries data (e.g., charts, graphs, etc.) using the pre-aggregated data rollups instead of the raw timeseries data. This allows applications 630 to simply retrieve and present the pre-aggregated data rollups without requiring applications 630 to perform an aggregation in response to the query. Since the data rollups are pre-aggregated, applications 630 can present the data rollups quickly and efficiently without requiring additional processing at query time to generate aggregated timeseries values.

In some embodiments, timeseries service 628 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 628 can calculate a virtual data point ($pointID_3$) by adding two or more actual data points ($pointID_1$ and $pointID_2$) (e.g., $pointID_3 = pointID_1 + pointID_2$). As another example, timeseries service 628 can calculate an enthalpy data point ($pointID_4$) based on a measured temperature data point ($pointID_5$) and a measured pressure data point ($pointID_6$) (e.g., $pointID_4 = enthalpy(pointID_5, pointID_6)$). The virtual data points can be stored as derived timeseries data.

Applications 630 can access and use the virtual data points in the same manner as the actual data points. Applications 630 may not need to know whether a data point is an actual data point or a virtual data point since both types of data points can be stored as derived timeseries data and can be handled in the same manner by applications 630. In some embodiments, the derived timeseries are stored with attributes designating each data point as either a virtual data point or an actual data point. Such attributes allow applications 630 to identify whether a given timeseries represents a virtual data point or an actual data point, even though both types of data points can be handled in the same manner by applications 630. These and other features of timeseries service 628 are described in greater detail with reference to FIG. 9.

In some embodiments, analytics service 624 analyzes the raw timeseries data and/or the derived timeseries data to detect faults. Analytics service 624 can apply a set of fault detection rules to the timeseries data to determine whether a fault is detected at each interval of the timeseries. Fault detections can be stored as derived timeseries data. For example, analytics service 624 can generate a new fault detection timeseries with data values that indicate whether a fault was detected at each interval of the timeseries. The fault detection timeseries can be stored as derived timeseries data along with the raw timeseries data in storage 614.

Still referring to FIG. 6, BMS 600 is shown to include several applications 630 including an energy management application 632, monitoring and reporting applications 634, and enterprise control applications 636. Although only a few applications 630 are shown, it is contemplated that applications 630 can include any of a variety of suitable applications configured to use the raw or derived timeseries generated by Cloud building management platform 620. In some embodiments, applications 630 exist as a separate layer of BMS 600 (e.g., a part of Cloud building management platform 620 and/or data collector 612). In other embodiments, applications 630 can exist as remote applications that run on remote systems or devices (e.g., remote systems and applications 544, client devices 548, and/or the like).

Applications 630 can use the derived timeseries data to perform a variety data visualization, monitoring, and/or control activities. For example, energy management application 632 and monitoring and reporting application 634 can use the derived timeseries data to generate user interfaces (e.g., charts, graphs, etc.) that present the derived timeseries data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 636 can use the derived timeseries data to perform various control activities. For example, enterprise control application 636 can use the derived timeseries data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for building subsystems 528. In some embodiments, building subsystems 528 use the control signals to operate building equipment. Operating the building equipment can affect the measured or calculated values of the data samples provided to BMS 600 and/or Cloud building management platform 620. Accordingly, enterprise control application 636 can use the derived timeseries data as feedback to control the systems and devices of building subsystems 528.

Cloud Building Management Platform Entity Service

Figure 7:
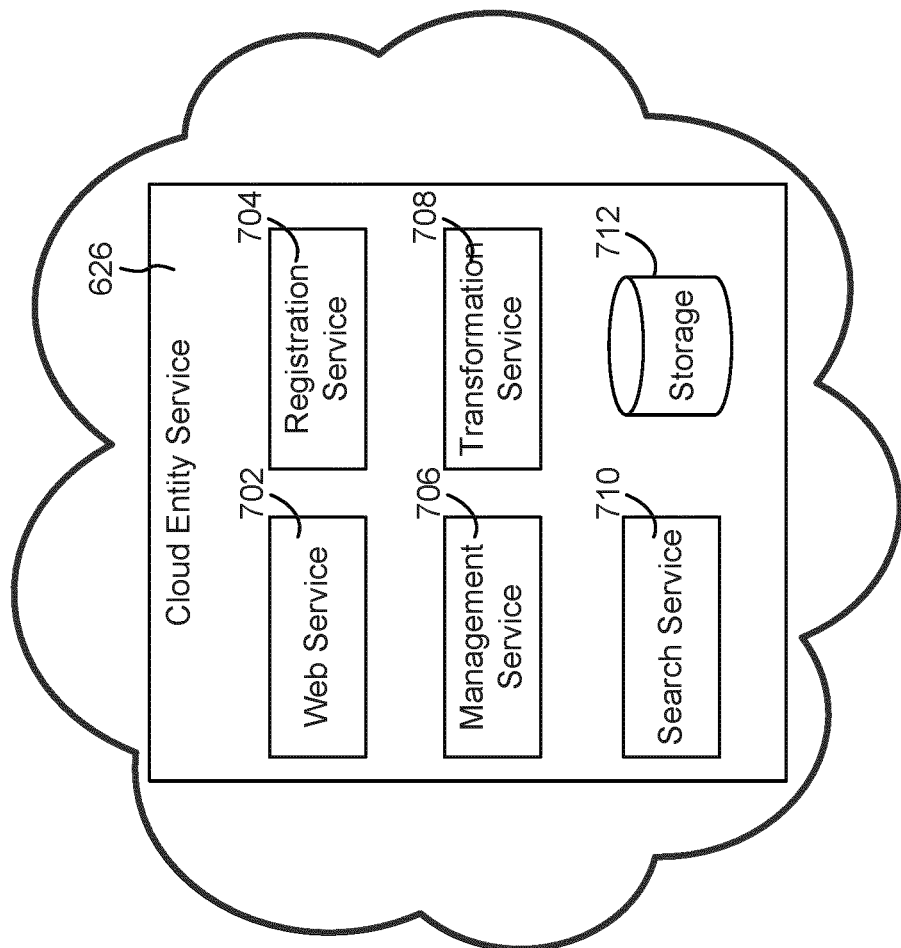
FIG. 7 is a block diagram illustrating an entity service of FIG. 6 in greater detail, according to some exemplary embodiments.

Referring now to FIG. 7, a block diagram illustrating entity service 626 in greater detail is shown, according to some embodiments. Entity service 626 registers and manages various buildings (e.g., 110-140), spaces, persons, subsystems (e.g., 428), devices (e.g., 112-146), and other entities in the Cloud building management platform 620.

According to various embodiments, an entity may be any person, place, or physical object, hereafter referred to as an object entity. Further, an entity may be any event, data point, or record structure, hereinafter referred to as data entity. In addition, relationships between entities may be defined by relational objects.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point (e.g., timeseries data) is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic temperature readings are received from a thermostat, an object entity corresponding to the thermostat could include the last temperature reading and a link to a data entity that stores a series of the last ten temperature readings received from the thermostat.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems or locations, expected location or behavior given a time of day, tendencies or preferences based on connected activity data received by entity service 626 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is derived, analyzed, inferred, calculated, or determined based on data from a plurality of data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, Cloud building management platform 620 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with Cloud building management platform 620 such that the global change can be implemented across all of the third-party applications without requiring manual implementation of the change in each disparate application.

Figure 8:
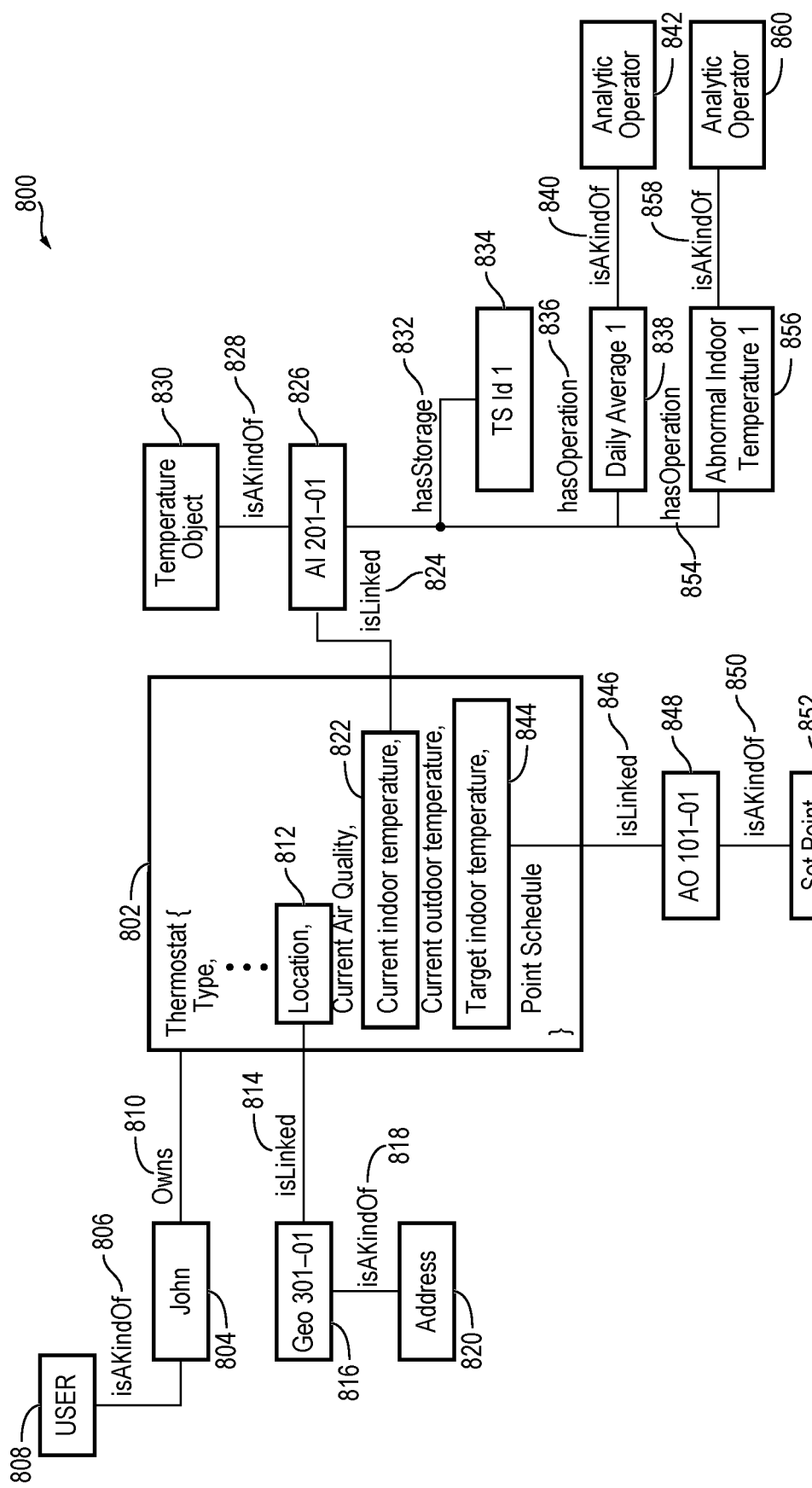
FIG. 8 in an example entity graph of entity data, according to some exemplary embodiments.

For example, referring to FIG. 8, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the entities. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Thermostat" may be represented via the below schema:

```
Thermostat{
    Type,
    Model No,
    Device Name,
    Manufactured date,
    Serial number,
    MAC address,
    Location,
    Current air quality,
    Current indoor temperature,
    Current outdoor temperature,
    Target indoor temperature,
    Point schedule (e.g., BACnet schedule object)
}
``` where various attributes are static attributes (e.g., "Type," "Model Number," "Device Name," etc.), dynamic attributes (e.g., "Current air quality," "Current outdoor temperature," etc.), or behavioral attributes (e.g., "Target indoor temperature," etc.) for the object entity "thermostat." In a relational database, the object "Thermostat" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.), dynamic attributes (e.g., "Age," "Location," etc.), or behavioral attributes (e.g., "Engineer") for the object entity "John Smith."

An example data entity for the data point "Current indoor temperature" for the "Thermostat" owned by John Smith in a relational database may be represented by the below table:

| Present-Value | Description | Device_Type | Unit of measure |
|---|---|---|---|
| 68 | "Current indoor temperature of John's house" | Thermostat | Degrees-F. | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, a BMS, building subsystem, or device may need data from a plurality of sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing.

For example, still referring to FIG. 8, an entity graph 800 for the Thermostat object entity 802 includes various class entities (e.g., User, Address, SetPoint Command, and Temperature Object), object entities (e.g., John and Thermostat), relational objects (e.g., isAKindOf, Owns, isLinked, hasStorage, and hasOperation), and data entities (AI 201-01, TS ID 1, Daily Average 1, Abnormal indoor temp 1, AO 101-1, and Geo 301-01). The relational objects describe the relationships between the various class, object, and data entities in a semantic and syntactic manner, so that an application or user viewing the entity graph 800 can quickly determine the relationships and data process flow of the Thermostat object entity 802, without having to resort to a data base analyst or engineer to create, index, and/or manage the entities (e.g., using SQL or NoSQL). In some embodiments, each of the entities (e.g., class entity, object entity, and data entity) represents a node on the entity graph 800, and the relational objects define the relationships or connections between the entities (or nodes).

For example, the entity graph 800 shows that a person named John (object entity) 804 isAKindOf (relational object) 806 User (class entity) 808. John 804 Owns (relational object) 810 the Thermostat (object entity) 802. The Thermostat 802 has a location attribute (dynamic attribute) 812 that isLinked (relational object) 814 to Geo 301-01 (data entity) 816, which isAKindOf (relational object) 818 an Address (class entity) 820. Accordingly, Geo 301-01 316 should have a data point corresponding to an address.

The Thermostat 802 further includes a "Current indoor temperature" attribute (dynamic attribute) 822 that isLinked (relational object) 824 to AI 201-01 (data entity) 826. AI 201-01 826 isAKindOf (relational object) 828 Temperature Object (class entity) 830. Thus, AI 201-01 826 should contain some sort of temperature related data. AI 201-01 826 hasStorage (relational object) 832 at TS ID 1 (data entity) 834, which may be raw or derived timeseries data for the temperature readings. AI 201-01 826 hasOperation (relational object) 836 of Daily Average 1 (data entity) 838, which isAKindOf (relational object) 840 Analytic Operator (class entity) 842. Thus, Daily Average 1 results from an analytic operation that calculates the daily average of the indoor temperature. AI 201-01 826 further hasOperation (relational object) 854 of Abnormal Indoor Temperature (data entity) 856, which isAKindOf (relational object) 858 Analytic Operator (class entity) 860. Accordingly, Abnormal Indoor Temperature results from an analytic operation to determine an abnormal temperature (e.g., exceeds or falls below a threshold value).

In this example, the data entity AI 201-01 526 may be represented by the following data model:

```
point {
    name: "AI 201-01";
    type: "analog input";
    value: 72;
    unit: "Degree-F";
    source: "Temperature Sensor 1"
}
``` where "point" is an example of a data entity that may be created by Cloud building management platform 620 to hold the value for the linked "Current indoor temperature" 822 dynamic attribute of the Thermostat entity 802, and source is the sensor or device in the Thermostat device that provides the data to the linked "Current indoor temperature" 822 dynamic attribute.

The data entity TS Id 1 534 may be represented, for example, by the following data model:

```
timeseries {
    name: "TS Id 1";
    type: "Daily Average";
    values: "[68, 20666, 70, 69, 71];
    unit: "Degree-F";
```

```
    point: "AI 201-01";
    source: "Daily Average 1"
}
``` where the data entity Daily Average 1 838 represents a specific analytic operator used to create the data entity for the average daily timeseries TS Id 1 834 based on the values of the corresponding data entity for point AI 201-01 826. The relational object hasOperation shows that the AI 201-01 data entity 826 is used as an input to the specific logic/math operation represented by Daily Average 1 838. TS Id 1 834 might also include an attribute that identifies the analytic operator Daily Average 1 838 as the source of the data samples in the timeseries.

Still referring to FIG. 8, the entity graph 800 for Thermostat 802 shows that the "Target indoor temperature" attribute (dynamic attribute) 844 isLinked (relational attribute) 846 to the data entity AO 101-01 (data entity) 848. AO 101-01 data entity 848 isAKindOf (relational attribute) 850 SetPoint Command (class entity) 852. Thus, the data in data entity AO 101-01 848 may be set via a command by the user or other entity, and may be used to control the Thermostat object entity 802. Accordingly, in various embodiments, entity graph 800 provides a user friendly view of the various relationships between the entities and data processing flow, which provides for ease of navigation, browsing, and analysis of data.

In some embodiments, any two entities (or nodes) can be connected to each other via one or more relational objects that define different relationships between the two entities (or nodes). For example, still referring to FIG. 8, the object entity John 804 is shown to be connected to the object entity Thermostat 802 via one relational object Owns 810. However, in another embodiment, the object entity John 804 can be connected to the object entity Thermostat 802 via more than one relational object, such that, in addition to the relational object Owns 810, another relational object can define another relationship between the object entity John 804 and the object entity Activity Tracker 802. For example, another relational object such as isInZone or isNotInZone can define whether or not John (or the entity object for John 804) is currently within the zone serviced by Thermostat 802 (e.g., via the relational object isInZone) or currently not within the zone serviced by Thermostat 802 (e.g., via the relational object isNotInZone).

In this case, when the data entities associated with the thermostat object entity 802 indicates that John is within the zone serviced by thermostat (e.g., which may be determined from the location attribute 812 and location data for John 810), the relational object isInZone may be created between the object entity for John 610 and the object entity for thermostat 802. On the other hand, when the data entities associated with the thermostat object entity 802 indicates that John is not within the zone serviced by the thermostat (e.g., which may be determined when the location attribute 812 shows a different location from a known location of John), the relational object isNotInZone can be created between the object entity for John 810 and the object entity for thermostat 802. For example, the relational object isNotInZone can be created by modifying the relational object isInZone or deleting the relational object isInZone and creating the relational object isNotInZone. Thus, in some embodiments, the relational objects can be dynamically created, modified, or deleted as needed or desired.

Referring again to FIG. 7, entity service 626 may transforms raw data samples and/or raw timeseries data into data corresponding to entity data. For example, as discussed above with reference to FIG. 8, entity service 626 can create data entities that use and/or represent data points in the timeseries data. Entity service 626 includes a web service 702, a registration service 704, a management service 706, a transformation service 708, a search service 710, and storage 712. In some embodiments, storage 712 may be internal storage or external storage. For example, storage 712 may be storage 614 (see FIG. 6), internal storage with relation to entity service 626, and/or may include a remote database, cloud-based data hosting, or other remote data storage.

Web service 702 can be configured to interact with web-based applications to send entity data and/or receive raw data (e.g., data samples, timeseries data, and the like). For example, web service 702 can provide an interface (e.g., API, UI/UX, and the like) to manage (e.g., register, create, edit, delete, and/or update) an entity (e.g., class entity, object entity, data entity, and/or the like) and the relational objects that define the relationships between the entities. In some embodiments, web service 702 provides entity data to web-based applications. For example, if one or more of applications 630 are web-based applications, web service 702 can provide entity data to the web-based applications. In some embodiments, web service 702 receives raw data samples and/or raw timeseries data including device information from a web-based data collector, or a web-based security service to identify authorized entities and to exchange secured messages. For example, if data collector 612 is a web-based application, web service 702 can receive the raw data samples and/or timeseries data including a device attribute indicating a type of device (e.g., IoT device) from which the data samples and/or timeseries data are received from data collector 612. In some embodiments, web service 702 may message security service 622 to request authorization information and/or permission information of a particular user, building, BMS, building subsystem, device, application, or other entity. In some embodiments, web service 702 receives derived timeseries data from timeseries service 628, and/or may provide entity data to timeseries service 628. In some embodiments, the entity service 626 processes and transforms the collected data to generate the entity data.

The registration service 704 can perform registration of devices and entities. For example, registration service 704 can communicate with building subsystems 528 and client devices 548 (e.g., via web service 702) to register each entity (e.g., building, BMS, building subsystems, devices, and the like) with Cloud building management platform 620. In some embodiments, registration service 704 registers a particular building subsystem 528 (or the devices therein) with a specific user and/or a specific set of permissions and/or entitlements. For example, a user may register a device key and/or a device ID associated with the device via a web portal (e.g., web service 702). In some embodiments, the device ID and the device key may be unique to the device. The device ID may be a unique number associated with the device such as a unique alphanumeric string, a serial number of the device, and/or any other static identifier. In various embodiments, the device is provisioned by a manufacturer and/or any other entity. In various embodiments, the device key and/or device ID are saved to the device or building subsystem 528 based on whether the device includes a trusted platform module (TPM). If the device includes a TPM, the device or building subsystem 528 may store the device key and/or device ID according to the protocols of the TPM. If the device does not include a TPM, the device or building subsystem 528 may store the device key and/or device ID in a file and/or file field which may be stored in a secure storage location. Further, in some embodiments, the device ID may be stored with BIOS software of the device. For example, a serial number of BIOS software may become and/or may be updated with the device ID.

In various embodiments, the device key and/or the device ID are uploaded to registration service 704 (e.g., an IoT hub such as AZURE® IoT Hub). In some embodiments, registration service 704 is configured to store the device key and the device ID in secure permanent storage and/or may be stored by security service 622 (e.g., by a security API). In some embodiments, a manufacturer and/or any other individual may register the device key and the device ID with registration service 704 (e.g., via web service 702). In various embodiments, the device key and the device ID are linked to a particular profile associated with the building subsystem 528 or device and/or a particular user profile (e.g., a particular user). In this regard, a device (or building subsystem 528) can be associated with a particular user. In various embodiments, the device key and the device ID make up the profile for device. The profile may be registered as a device that has been manufactured and/or provisioned but has not yet been purchased by an end user.

In various embodiments, registration service 704 adds and/or updates a device in an building hub device registry. In various embodiments, registration service 704 may determine if the device is already registered, can set various authentication values (e.g., device ID, device key), and can update the building hub device registry. In a similar manner, registration service 704 can update a document database with the various device registration information.

In some embodiments, registration service 704 can be configured to create a virtual representation (e.g., "digital twins" or "shadow records") of each object entity (e.g., person, room, building subsystem, device, and the like) in the building within Cloud building management platform 620. In some embodiments, the virtual representations are smart entities that include attributes defining or characterizing the corresponding object and are associated to the corresponding object entity via relational objects defining the relationship of the object and the smart entity representation thereof. In some embodiments, the virtual representations maintain shadow copies of the object entities with versioning information so that entity service 626 can store not only the most recent update of an attribute (e.g., a dynamic attribute) associated with the object, but records of previous states of the attributes (e.g., dynamic attributes) and/or entities. For example, the shadow record may be created as a type of data entity that is related to a linked data entity corresponding to the dynamic attribute of the object entity (e.g., the person, room, building subsystem, device, and the like). For example, the shadow entity may be associated with the linked data entity via a relational object (e.g., isLinked, hasStorage, hasOperation, and the like). In this case, the shadow entity may be used to determine additional analytics for the data point of the dynamic attribute. For example, the shadow entity may be used to determine an average value, an expected value, or an abnormal value of the data point from the dynamic attribute.

Management service 706 may create, modify, or update various attributes, data entities, and/or relational objects of the objects managed by entity service 626 for each entity rather than per class or type of entity. This allows for separate processing/analytics for each individual entity rather than only to a class or type of entity. Some attributes (or data entities) may correspond to, for example, the most recent value of a data point provided to BMS 600 or Cloud building management platform 620 via the raw data samples and/or timeseries data. For example, the "Current indoor temperature" dynamic attribute of the "Thermostat" object entity 802 in the example discussed above may be the most recent value of indoor temperature provided by the Thermostat device. Management service 706 can use the relational objects of the entity data for Thermostat to determine where to update the data of the attribute.

For example, Management service 706 may determine that a data entity (e.g., AI 201-01) is linked to the "Current indoor temperature" dynamic attribute of Thermostat via an isLinked relational object. In this case, Management service 706 may automatically update the attribute data in the linked data entity. Further, if a linked data entity does not exist, Management service 706 can create a data entity (e.g., AI 201-01) and an instance of the isLinked relational object 824 to store and link the "Current indoor temperature" dynamic attribute of Thermostat therein. Accordingly, processing/analytics for Thermostat 802 may be automated. As another example, a "most recent view" attribute (or linked data entity) of a webpage object entity may indicate the most recent time at which the webpage was viewed. Management service 706 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 706 can use the relational objects in entity data to identify a related access control device (e.g., a card reader, a keypad, etc.) at the entrance/exit of a building object entity. Management service 706 can use raw data received from the identified access control device to track the number of occupants entering and exiting the building object entity (e.g., via related card entities used by the occupants to enter and exit the building). Management service 706 can update a "number of occupants" attribute (or corresponding data entity) of the building object entity each time a person enters or exits the building using a related card object entity, such that the "number of occupants" attribute (or data entity) reflects the current number of occupants within the building (or related building object entity). As another example, a "total revenue" attribute associated with a product line object entity may be the summation of all the revenue generated from related point of sales entities. Management service 706 can use the raw data received from the related point of sales entities to determine when a sale of the product occurs, and can identify the amount of revenue generated by the sales. Management service 706 can then update the "total revenue" attribute (or related data entity) of the product line object entity by adding the most recent sales revenue from each of the related point of sales entities to the previous value of the attribute.

In some embodiments, management service 706 may use derived timeseries data generated from timeseries service 628 to update or create a data entity (e.g., Daily Average 1) that uses or stores the data points in the derived timeseries data. For example, the derived timeseries data may include a virtual data point corresponding to the daily average steps calculated by timeseries service 628, and management service 706 may update the data entity or entities that store or use the data corresponding to the virtual data point as determined via the relational objects. In some embodiments, if a data entity corresponding to the virtual data point does not exist, management service 706 may automatically create a corresponding data entity and one or more relational objects that describe the relationship between the corresponding data entity and other entities.

In some embodiments, management service 706 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 706 can use relational objects of the person object entity to identify a related card device and/or a related card reader from a related building object entity (e.g., the building in which the person works) to determine the physical location of the person at any given time. Management service 706 can determine from raw data (e.g., time that the card device was scanned by the card reader) or derived timeseries data (e.g., average time of arrival) whether the person object is located in the building or may be in transit to the building. Management service 706 can use weather data from a weather service in the region in which the building object entity is located to determine whether any severe weather is approaching the person's location. Similarly, management service 706 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 706 can use these and other types of data as inputs to a risk function that calculates the value of the person object's "risk" attribute and can update the person object (or related device entity of the person object) accordingly.

In some embodiments, management service 706 can be configured to synchronize configuration settings, parameters, and other device-specific or object-specific information between the entities and Cloud building management platform 620. In some embodiments, the synchronization occurs asynchronously. Management service 706 can be configured to manage device properties dynamically. The device properties, configuration settings, parameters, and other device-specific information can be synchronized between the smart entities created by and stored within Cloud building management platform 620.

In some embodiments, management service 706 is configured to manage a manifest for each of the building subsystems 528 (or devices therein). The manifest may include a set of relationships between the building subsystems 528 and various entities. Further, the manifest may indicate a set of entitlements for the building subsystems 528 and/or entitlements of the various entities and/or other entities. The set of entitlements may allow a BMS 600, building subsystem 528 and/or a user to perform certain actions within the building or (e.g., control, configure, monitor, and/or the like).

Still referring to FIG. 7, transformation service 708 can provide data virtualization, and can transform various predefined standard data models for entities in a same class or type to have the same entity data structure, regardless of the object, device, or Thing that the entity represents. For example, each object entity under an object class may include a location attribute, regardless of whether or not the location attribute is used or even generated. Thus, if an application is later developed requiring that each object entity includes a location attribute, manual mapping of heterogenous data of different entities in the same class may be avoided. Accordingly, interoperability and scalability of applications may be improved.

In some embodiments, transformation service 708 can provide entity matching, cleansing, and correlation so that a unified cleansed view of the entity data including the entity related information (e.g., relational objects) can be provided. Transformation service 708 can support semantic and syntactic relationship description in the form of standardized relational objects between the various entities. This may simplify machine learning because the relational objects themselves provide all the relationship description between the entities. Accordingly, the rich set of pre-built entity models and standardized relational objects may provide for rapid application development and data analytics.

Still referring to FIG. 7, the search service 710 provides a unified view of product related information in the form of the entity graph, which correlates entity relationships (via relational objects) among multiple data sources (e.g., CRM, ERP, MRP and the like). In some embodiments, the search service 710 is based on a schema-less and graph based indexing architecture. For example, in some embodiments, the search service 710 provides the entity graph in which the entities are represented as nodes with relational objects defining the relationship between the entities (or nodes). The search service 710 facilitates simple queries without having to search multiple levels of the hierarchical tree of the entity graph. For example, search service 710 can return results based on searching of entity type, individual entities, attributes, or even relational objects without requiring other levels or entities of the hierarchy to be searched.

Timeseries Data Platform Service

Figure 9:
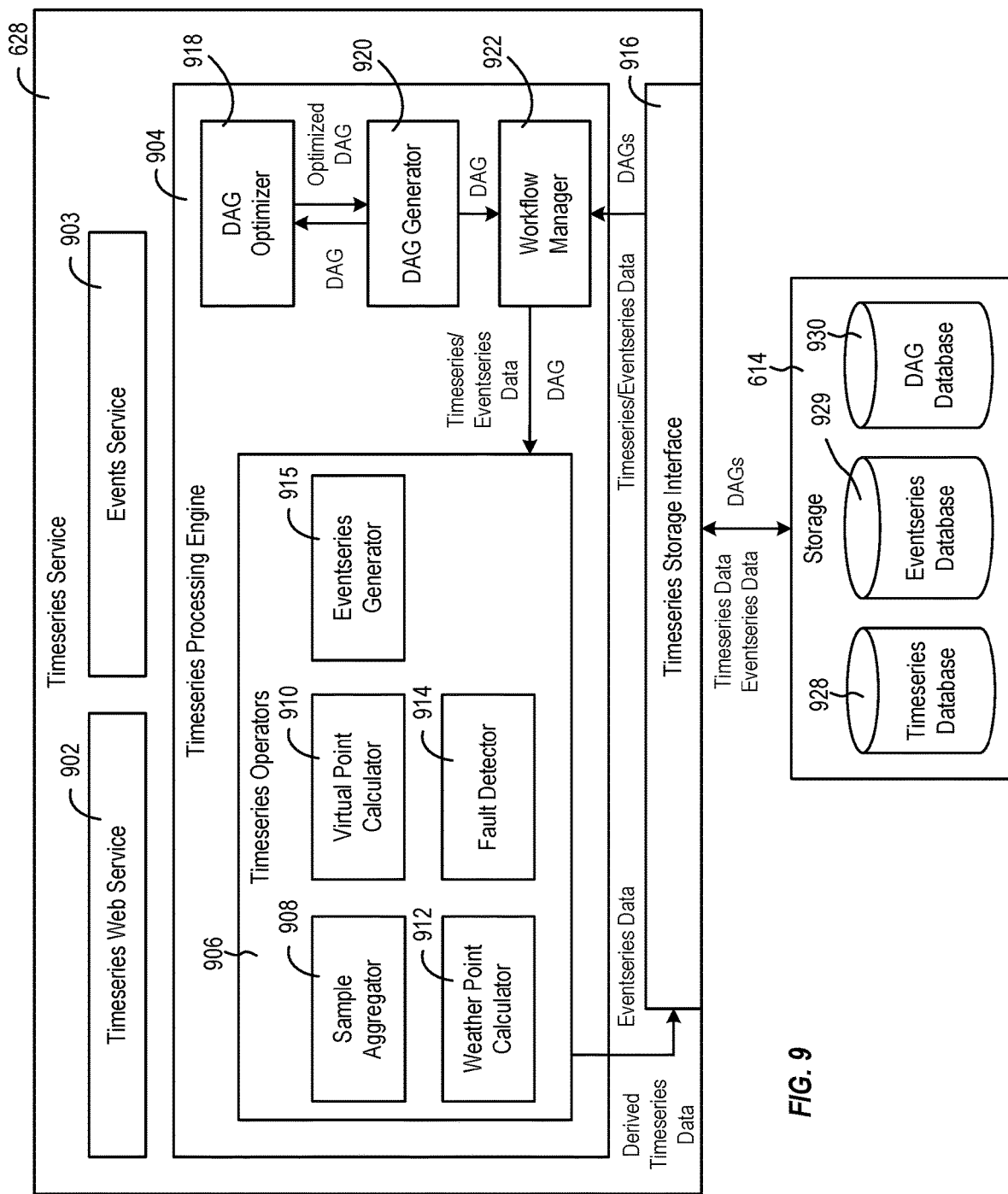
FIG. 9 is a block diagram illustrating timeseries service of FIG. 6 in greater detail, according to some exemplary embodiments.

Referring now to FIG. 9, a block diagram illustrating timeseries service 628 in greater detail is shown, according to some embodiments. Timeseries service 628 is shown to include a timeseries web service 902, an events service 903, a timeseries processing engine 904, and a timeseries storage interface 916. Timeseries web service 902 can be configured to interact with web-based applications to send and/or receive timeseries data. In some embodiments, timeseries web service 902 provides timeseries data to web-based applications. For example, if one or more of applications 630 are web-based applications, timeseries web service 902 can provide derived timeseries data and/or raw timeseries data to the web-based applications. In some embodiments, timeseries web service 902 receives raw timeseries data from a web-based data collector. For example, if data collector 612 is a web-based application, timeseries web service 902 can receive raw data samples or raw timeseries data from data collector 612. In some embodiments, timeseries web service 902 and entity service web service 702 may be integrated as parts of the same web service.

Timeseries storage interface 916 can be configured to store and read samples of various timeseries (e.g., raw timeseries data and derived timeseries data) and eventseries (described in greater detail below). Timeseries storage interface 916 can interact with storage 614. For example, timeseries storage interface 916 can retrieve timeseries data from a timeseries database 928 within storage 614. In some embodiments, timeseries storage interface 916 reads samples from a specified start time or start position in the timeseries to a specified stop time or a stop position in the timeseries. Similarly, timeseries storage interface 916 can retrieve eventseries data from an eventseries database 929 within storage 614. Timeseries storage interface 916 can also store timeseries data in timeseries database 928 and can store eventseries data in eventseries database 929. Advantageously, timeseries storage interface 916 provides a consistent interface which enables logical data independence.

In some embodiments, timeseries storage interface 916 stores timeseries as lists of data samples, organized by time. For example, timeseries storage interface 916 can store timeseries in the following format:

[<key, $timestamp_1$, $value_1$>, <key, $timestamp_2$, $value_2$>, <key, $timestamp_3$, $value_3$>]

where key is an identifier of the source of the data samples (e.g., timeseries ID, sensor ID, device ID, etc.), timestamp identifies a time associated with the ith sample, and $value_i$ indicates the value of the ith sample.

In some embodiments, timeseries storage interface 916 stores eventseries as lists of events having a start time, an end time, and a state. For example, timeseries storage interface 916 can store eventseries in the following format:

[<$eventID_1$, $start\_timestamp_1$, $end\_timestamp_1$, $state_1$>, . . . , <$eventID_N$, $start\_timestamp_N$, $end\_timestamp_N$, $state_N$>]

where $eventID_i$ is an identifier of the ith event, $start\_timestamp_i$ is the time at which the ith event started, $end\_timestamp_i$ is the time at which the ith event ended, state describes a state or condition associated with the ith event (e.g., cold, hot, warm, etc.), and N is the total number of events in the eventseries.

In some embodiments, timeseries storage interface 916 stores timeseries and eventseries in a tabular format. Timeseries storage interface 916 can store timeseries and eventseries in various tables having a column for each attribute of the timeseries/eventseries samples (e.g., key, timestamp, value). The timeseries tables can be stored in timeseries database 928, whereas the eventseries tables can be stored in eventseries database 929. In some embodiments, timeseries storage interface 916 caches older data to storage 614 but stores newer data in RAM. This may improve read performance when the newer data are requested for processing.

In some embodiments, timeseries storage interface 916 omits one or more of the attributes when storing the timeseries samples. For example, timeseries storage interface 916 may not need to repeatedly store the key or timeseries ID for each sample in the timeseries. In some embodiments, timeseries storage interface 916 omits timestamps from one or more of the samples. If samples of a particular timeseries have timestamps at regular intervals (e.g., one sample each minute), timeseries storage interface 916 can organize the samples by timestamps and store the values of the samples in a row. The timestamp of the first sample can be stored along with the interval between the timestamps. Timeseries storage interface 916 can determine the timestamp of any sample in the row based on the timestamp of the first sample and the position of the sample in the row.

In some embodiments, timeseries storage interface 916 stores one or more samples with an attribute indicating a change in value relative to the previous sample value. The change in value can replace the actual value of the sample when the sample is stored in timeseries database 928. This allows timeseries storage interface 916 to use fewer bits when storing samples and their corresponding values. Timeseries storage interface 916 can determine the value of any sample based on the value of the first sample and the change in value of each successive sample.

In some embodiments, timeseries storage interface 916 invokes entity service 626 to create data entities in which samples of timeseries data and/or eventseries data can be stored. The data entities can include JSON objects or other types of data objects to store one or more timeseries samples and/or eventseries samples. Timeseries storage interface 916 can be configured to add samples to the data entities and read samples from the data entities. For example, timeseries storage interface 916 can receive a set of samples from data collector 612, entity service 626, timeseries web service 902, events service 903, and/or timeseries processing engine 904. Timeseries storage interface 916 can add the set of samples to a data entity by sending the samples to entity service 626 to be stored in the data entity, for example, or may directly interface with the data entity to add/modify the sample to the data entity.

Timeseries storage interface 916 can use data entities when reading samples from storage 614. For example, timeseries storage interface 916 can retrieve a set of samples from storage 614 or from entity service 626, and add the samples to a data entity (e.g., directly or via entity service 626). In some embodiments, the set of samples include all samples within a specified time period (e.g., samples with timestamps in the specified time period) or eventseries samples having a specified state. Timeseries storage interface 916 can provide the samples in the data entity to timeseries web service 902, events service 903, timeseries processing engine 904, applications 630, and/or other components configured to use the timeseries/eventseries samples.

Still referring to FIG. 9, timeseries processing engine 904 is shown to include several timeseries operators 906. Timeseries operators 906 can be configured to apply various operations, transformations, or functions to one or more input timeseries to generate output timeseries and/or eventseries. The input timeseries can include raw timeseries data and/or derived timeseries data. Timeseries operators 906 can be configured to calculate aggregate values, averages, or apply other mathematical operations to the input timeseries. In some embodiments, timeseries operators 906 generate virtual point timeseries by combining two or more input timeseries (e.g., adding the timeseries together), creating multiple output timeseries from a single input timeseries, or applying mathematical operations to the input timeseries. In some embodiments, timeseries operators 906 perform data cleansing operations or deduplication operations on an input timeseries. In some embodiments, timeseries operators 906 use the input timeseries to generate eventseries based on the values of the timeseries samples. The output timeseries can be stored as derived timeseries data in storage 614 as one or more timeseries data entities. Similarly, the eventseries can be stored as eventseries data entities in storage 614.

In some embodiments, timeseries operators 906 do not change or replace the raw timeseries data, but rather generate various "views" of the raw timeseries data (e.g., as separate data entities) with corresponding relational objects defining the relationships between the raw timeseries data entity and the various views data entities. The views can be queried in the same manner as the raw timeseries data. For example, samples can be read from the raw timeseries data entity, transformed to create the view entity, and then provided as an output. Because the transformations used to create the views can be computationally expensive, the views can be stored as "materialized view" data entities in timeseries database 928. Instances of relational objects can be created to define the relationship between the raw timeseries data entity and the materialize view data entities. These materialized views are referred to as derived data timeseries throughout the present disclosure.

Timeseries operators 906 can be configured to run at query time (e.g., when a request for derived data timeseries is received) or prior to query time (e.g., when new raw data samples are received, in response to a defined event or trigger, etc.). This flexibility allows timeseries operators 906 to perform some or all of their operations ahead of time and/or in response to a request for specific derived data timeseries. For example, timeseries operators 906 can be configured to pre-process one or more timeseries that are read frequently to ensure that the timeseries are updated whenever new data samples are received, and the pre-processed timeseries may be stored in a corresponding data entity for retrieval. However, timeseries operators 906 can be configured to wait until query time to process one or more timeseries that are read infrequently to avoid performing unnecessary processing operations.

In some embodiments, timeseries operators 906 are triggered in a particular sequence defined by a directed acyclic graph (DAG). The DAG may define a workflow or sequence of operations or transformations to apply to one or more input timeseries. For example, the DAG for a raw data timeseries may include a data cleansing operation, an aggregation operation, and a summation operation (e.g., adding two raw data timeseries to create a virtual point timeseries). The DAGs can be stored in a DAG database 930 within storage 614, or internally within timeseries processing engine 904. DAGs can be retrieved by workflow manager 922 and used to determine how and when to process incoming data samples. Exemplary systems and methods for creating and using DAGs are described in greater detail below.

Timeseries operators 906 can perform aggregations for dashboards, cleansing operations, logical operations for rules and fault detection, machine learning predictions or classifications, call out to external services, or any of a variety of other operations which can be applied to timeseries data. The operations performed by timeseries operators 906 are not limited to timeseries data. Timeseries operators 906 can also operate on event data or function as a billing engine for a consumption or tariff-based billing system. Timeseries operators 906 are shown to include a sample aggregator 908, a virtual point calculator 910, a weather point calculator 912, a fault detector 914, and an eventseries generator 915.

Still referring to FIG. 9, timeseries processing engine 904 is shown to include a DAG optimizer 918. DAG optimizer 918 can be configured to combine multiple DAGs or multiple steps of a DAG to improve the efficiency of the operations performed by timeseries operators 906. For example, suppose that a DAG has one functional block which adds "Timeseries A" and "Timeseries B" to create "Timeseries C" (i.e., A+B=C) and another functional block which adds "Timeseries C" and "Timeseries D" to create "Timeseries E" (i.e., C+D=E). DAG optimizer 918 can combine these two functional blocks into a single functional block which computes "Timeseries E" directly from "Timeseries A," "Timeseries B," and "Timeseries D" (i.e., E=A+B+D). Alternatively, both "Timeseries C" and "Timeseries E" can be computed in the same functional block to reduce the number of independent operations required to process the DAG.

In some embodiments, DAG optimizer 918 combines DAGs or steps of a DAG in response to a determination that multiple DAGs or steps of a DAG will use similar or shared inputs (e.g., one or more of the same input timeseries). This allows the inputs to be retrieved and loaded once rather than performing two separate operations that both load the same inputs. In some embodiments, DAG optimizer 918 schedules timeseries operators 906 to nodes where data is resident in memory in order to further reduce the amount of data required to be loaded from the timeseries database 928.

Timeseries processing engine 904 is shown to include a directed acyclic graph (DAG) generator 920. DAG generator 920 can be configured to generate one or more DAGs for each raw data timeseries. Each DAG may define a workflow or sequence of operations which can be performed by timeseries operators 906 on the raw data timeseries. When new samples of the raw data timeseries are received, workflow manager 922 can retrieve the corresponding DAG and use the DAG to determine how the raw data timeseries should be processed. In some embodiments, the DAGs are declarative views which represent the sequence of operations applied to each raw data timeseries. The DAGs may be designed for timeseries rather than structured query language (SQL).

In some embodiments, DAGs apply over windows of time. For example, the timeseries processing operations defined by a DAG may include a data aggregation operation that aggregates a plurality of raw data samples having timestamps within a given time window. The start time and end time of the time window may be defined by the DAG and the timeseries to which the DAG is applied. The DAG may define the duration of the time window over which the data aggregation operation will be performed. For example, the DAG may define the aggregation operation as an hourly aggregation (i.e., to produce an hourly data rollup timeseries), a daily aggregation (i.e., to produce a daily data rollup timeseries), a weekly aggregation (i.e., to produce a weekly data rollup timeseries), or any other aggregation duration. The position of the time window (e.g., a specific day, a specific week, etc.) over which the aggregation is performed may be defined by the timestamps of the data samples of timeseries provided as an input to the DAG.

In operation, sample aggregator 908 can use the DAG to identify the duration of the time window (e.g., an hour, a day, a week, etc.) over which the data aggregation operation will be performed. Sample aggregator 908 can use the timestamps of the data samples in the timeseries provided as an input to the DAG to identify the location of the time window (i.e., the start time and the end time). Sample aggregator 908 can set the start time and end time of the time window such that the time window has the identified duration and includes the timestamps of the data samples. In some embodiments, the time windows are fixed, having predefined start times and end times (e.g., the beginning and end of each hour, day, week, etc.). In other embodiments, the time windows may be sliding time windows, having start times and end times that depend on the timestamps of the data samples in the input timeseries.

Figure 10:
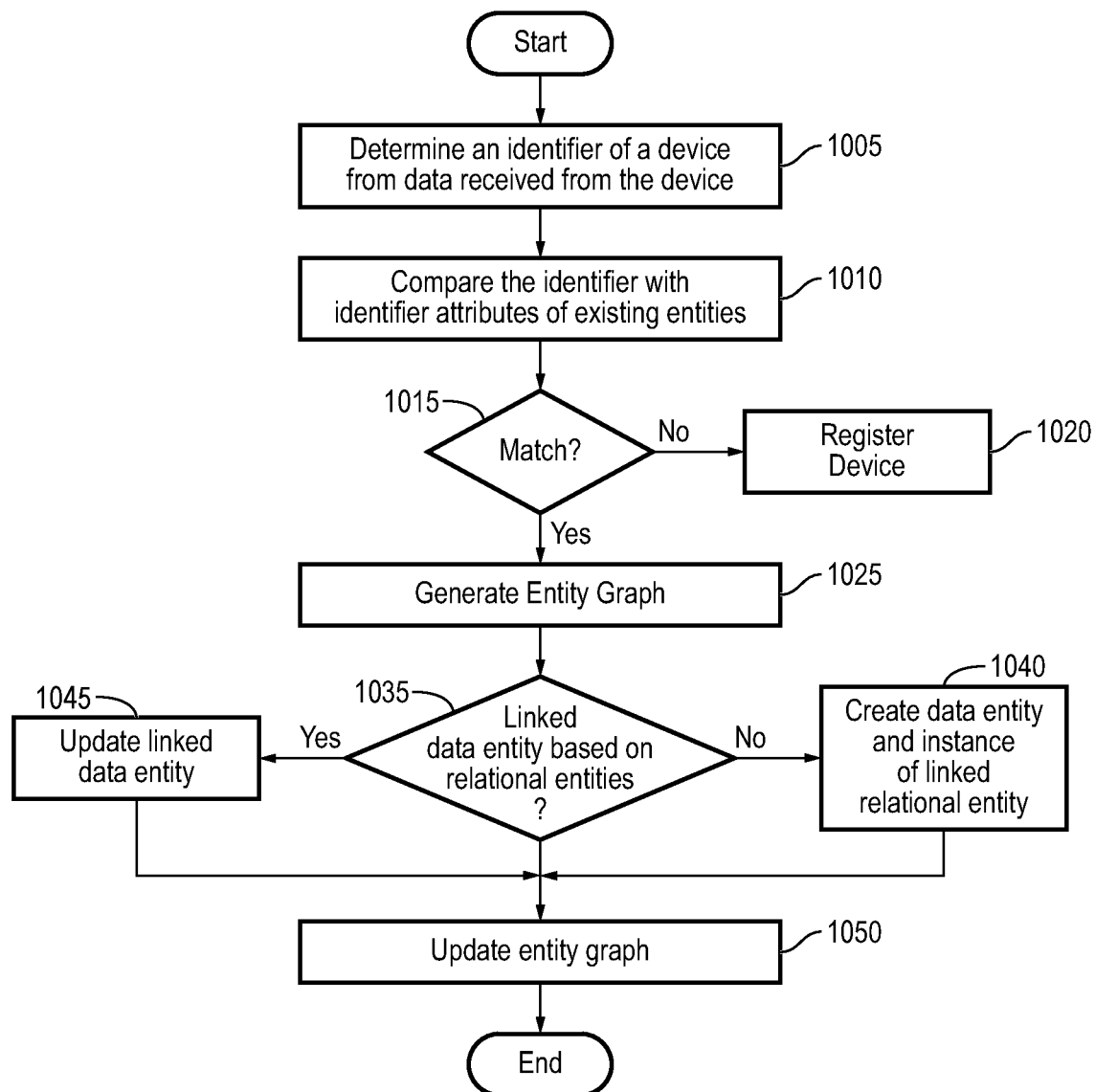
FIG. 10 is a flow diagram of a process or method for updating/creating an attribute of a related entity based on data received from a device of a building management subsystem, according to some exemplary embodiments.

FIG. 10 shows a flow diagram of a process or method for updating/creating a data entity based on data received from a device of a building subsystem, according to some embodiments. Referring to FIG. 10, the process starts, and when timeseries data (e.g., raw or input timeseries data) that has been generated for a device of a building subsystem (e.g., by the data collector) is received, the transformation service 708 may determine an identifier of the device from the received timeseries data at block 1005. At block 1010, the transformation service 708 may compare an identity static attribute from the data with identity static attributes of registered object entities to locate a data container for the device. If a match does not exist from the comparison at block 1015, the transformation service 708 may invoke the registration service to register the device at block 1020. If a match exists from the comparison at block 1015, the transformation service 708 may generate an entity graph or retrieve entity data for the device at block 1025. From the entity graph or entity data, transformation service 708 may determine if a corresponding data entity exists based on the relational objects (e.g., isLinked) for the device to update a dynamic attribute from the data at block 1025. If not, management service 706 may create a data entity for the dynamic attribute and an instance of a corresponding relational object (e.g., isLinked) to define the relationship between the dynamic attribute and created data entity at block 1040. If the corresponding data entity exists, management service 706 may update the data entity corresponding to the dynamic attribute from the data at block 1045. Then, transformation service 708 may update or regenerate the entity graph or entity data at block 1050, and the process may end.

Figure 11:
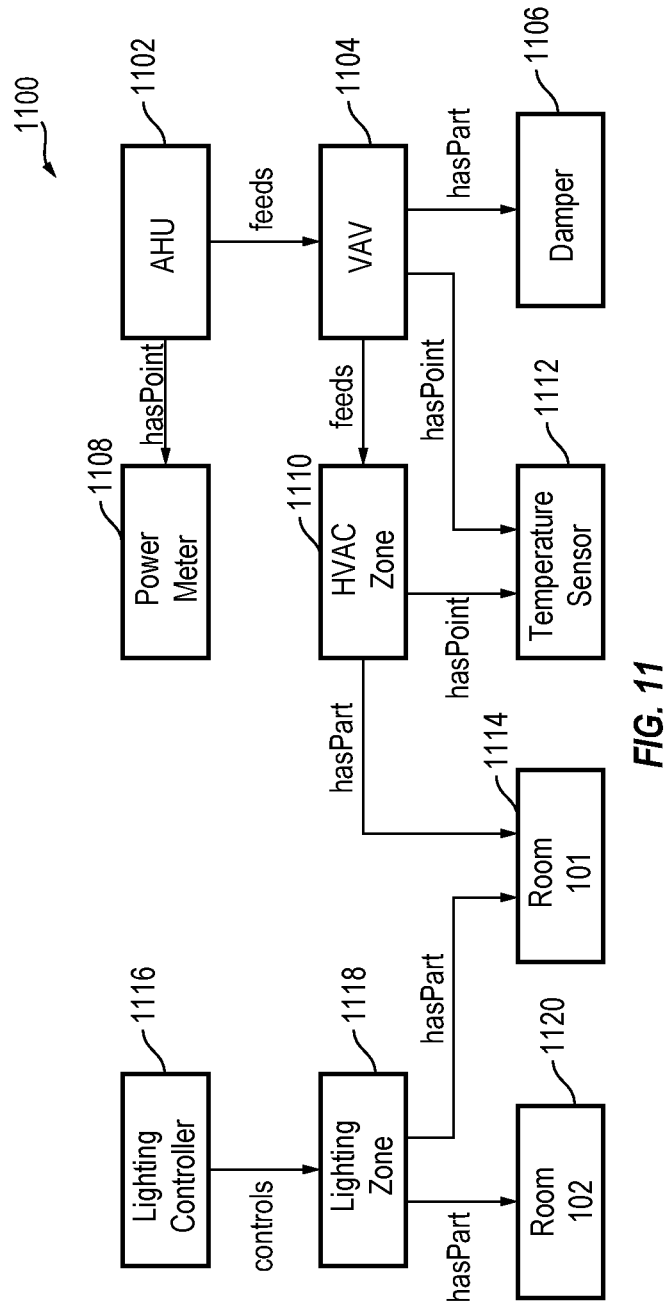
FIG. 11 is an example entity graph of entity data, according to some exemplary embodiments.

FIG. 11 is an example entity graph of entity data according to an embodiment of the present disclosure. The example of FIG. 11 assumes that an HVAC fault detection application has detected an abnormal temperature measurement with respect to Temperature Sensor 1112. However, Temperature Sensor 1112 itself may be operating properly, but may rely on various factors, conditions, and other systems and devices to measure the temperature properly. Accordingly, for example, the HVAC fault detection application may need to know the room 1114 in which the Temperature Sensor 1112 is located, the corresponding temperature setpoint, the status of the VAV 1104 that supplies conditioned air to the room 1114, the status of the AHU 1102 that feeds the VAV 1104, the status of the vents in the HVAC zone 1110, etc., in order to pin point the cause of the abnormal measurement. Thus, the HVAC fault detection application may require additional information from various related subsystems and devices (e.g., entity objects), as well as the zones and rooms (e.g., entity objects) that the subsystems and devices are configured to serve, to properly determine or infer the cause of the abnormal measurement.

Referring to FIG. 11, entity graph 1100 represents each of the entities (e.g., Temperature Sensor 1112 and related entities) as nodes on the entity graph 1100, and shows the relationship between the nodes (e.g., Temperature Sensor 1112 and related entities) via relational objects (e.g., feeds, hasPoint, hasPart, Controls, etc.). For example, entity graph 1100 shows that Temperature Sensor 1112 provides temperature readings (e.g., hasPoint) to the VAV 1104 and the HVAC Zone 1110. An AHU 1102 provides (e.g., feeds) the VAV 1104 with chilled and/or heated air. The AHU 1102 receives/provides power readings (e.g., hasPoint) from/to a Power Meter 1108. The VAV 1104 provides (e.g., feeds) air to HVAC Zone 1110 using (e.g., hasPart) a Damper 1106. The HVAC Zone 1110 provides the air to Room 1114. Further, Rooms 1114 and 1120 are located in (e.g., hasPart) Lighting Zone 1118, which is controlled (e.g., controls) by Lighting Controller 1116.

Accordingly, in the example of FIG. 11, in response to receiving the faulty measurement from Temperature Sensor 1112, the HVAC fault detection application and/or analytics service 624 can determine from the entity graph that the fault could be caused by some malfunction in one or more of the other related entities, and not necessarily a malfunction of the Temperature Sensor 1112. Thus, the HVAC fault detection application and/or the analytics service 624 can further investigate into the other related entities to determine or infer the most likely cause of the fault.

Figure 12:
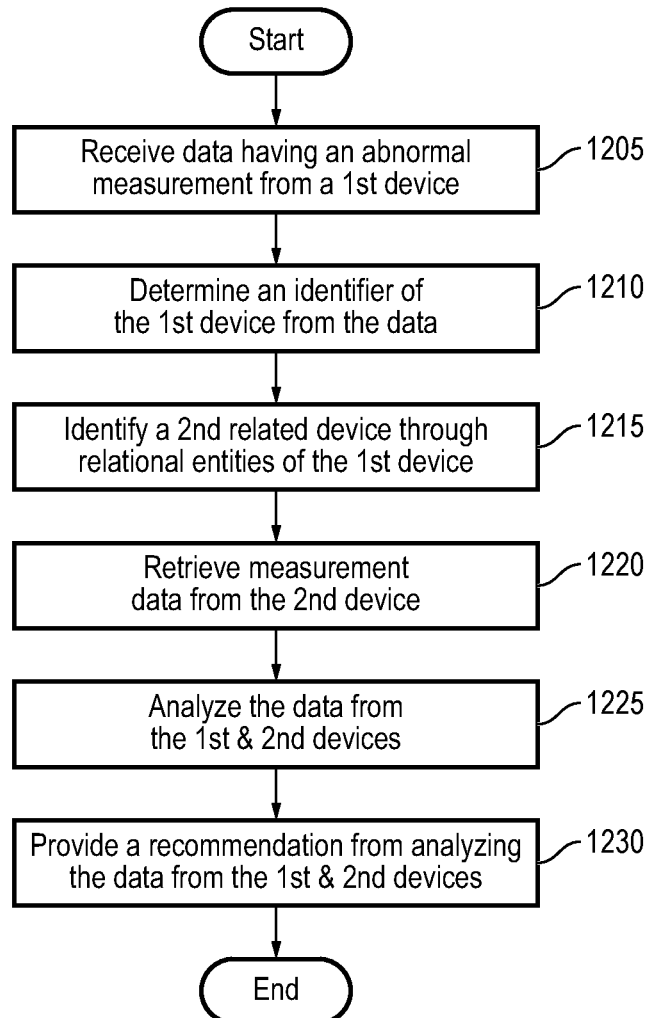
FIG. 12 is a flow diagram of a process or method for analyzing data from a second related device based on data from a first device, according to some exemplary embodiments.

For example, FIG. 12 is a flow diagram of a process or method for analyzing data from a second related device based on data from a first device, according to some embodiments. Referring to FIG. 12, the process starts and timeseries data (e.g., raw or input timeseries data generated by data collector) including an abnormal measurement from a first device is received at block 1205. Transformation service 708 determines an identifier of the first device from the received timeseries data at block 1210. Transformation service 708 identifies a second device that is related to the first device through relational objects associated with the first device at block 1215. The second device can be part of the same building subsystem as that of the first device or different building subsystem, and can be for a same building as that of the first device or different building. Transformation service 708 invokes web service 702 to retrieve measurement data from the second device at block 1220. Analytics service 624 analyzes the data from the first device and the second device at block 1225. Analytics service 624 provides a recommendation from the analysis of the data from each of the first device and the second device at block 1230, and the process ends.

Figure 13:
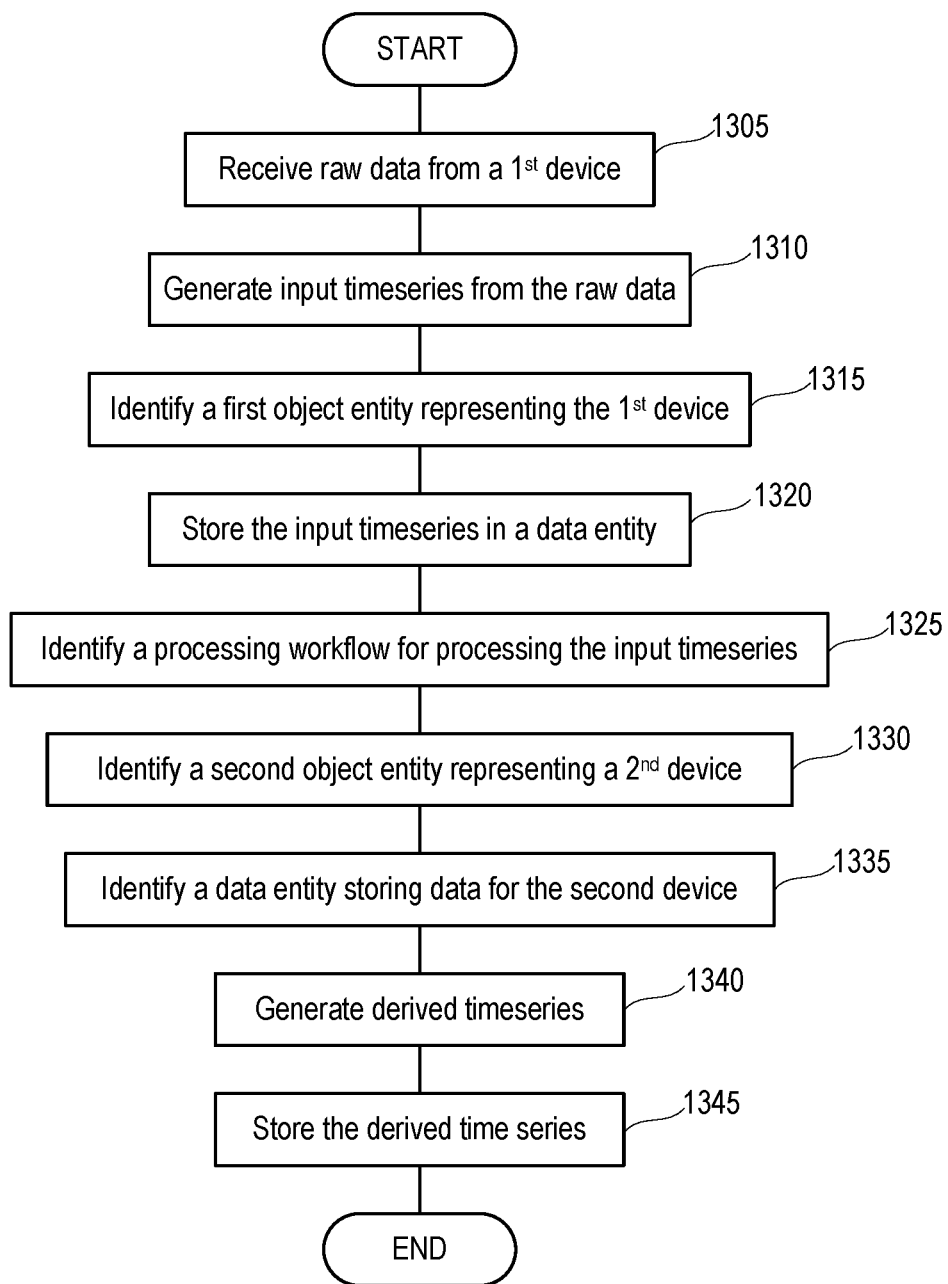
FIG. 13 is a flow diagram of a process or method for generating derived timeseries from data generated by a first device and a second device, according to some exemplary embodiments.

FIG. 13 is a flow diagram of a process or method for generating derived timeseries from data generated by a first device and a second device, according to some embodiments. Referring to FIG. 13, the process starts and raw data is received from a first device of a building management subsystem at block 1305. The raw data may include one or more data points generated by the first device. For example, the data points may be measurement values generated by the first device. The data collector 612 generates raw (or input) timeseries from the raw data at block 1310. The raw timeseries may include an identifier of the first device, a timestamp (e.g., a local timestamp) of when the one or more data points were generated by the first device and an offset value, and a value of the one or more data points.

Transformation service 708 determines an identifier of the first device from the raw timeseries data, and identifies (e.g., using entity graph or data) a first object entity representing the first device at block 1315. The raw timeseries data is stored in a corresponding data entity that is related to the first object entity at block 1320. For example, transformation service 708 may identify the corresponding data entity from a relational object defining the relationship between the first object entity and the corresponding data entity.

Timeseries processing engine 904 identifies a processing workflow (e.g., a DAG processing workflow) to process the raw timeseries data at block 1325. In the example of FIG. 13, the processing workflow takes as input, the raw timeseries data for the first device, and data from a second device. The second device can be part of the same building subsystem as that of the first device or different building subsystem, and can be for a same building as that of the first device or different building. A second object entity for the second device is identified at block 1330. For example, the second object entity may be determined from a relational object indicating a relationship between the first object entity and the second object entity. A corresponding data entity storing raw or derived timeseries data for the second device is identified at block 1335. For example, the corresponding data entity may be determined from a relational descriptor indicating a relationship between the second object entity and the corresponding data entity.

The processing workflow is executed to generate the derived timeseries at block 1340. For example, the derived timeseries may include a virtual data point that is calculated using data from the first device and the second device. For example, an arithmetic operation may be performed on the data of the first and second devices to calculate the virtual data point. A corresponding data entity is identified to store the derived timeseries. For example, the corresponding data entity may be identified through one or more relational objects indicating a relationship between the corresponding data entity and the first device and/or the corresponding data entity and the second device. The derived timeseries is stored in the corresponding data entity at block 1345, and the process ends.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A building system of a building comprising one or more storage devices storing instructions thereon that, when executed by one or more processors, cause the one or more processors to:
store a plurality of entities and a plurality of relationships between the plurality of entities in a building entity database, wherein a building component entity of the plurality of entities represents a building component of the building, wherein a software component entity of the plurality of entities provides a virtual representation of a software component that is stored, and executes outside of, the building entity database, the software component performs one or more operations with data of the building component, the software component entity related to the building component entity by one or more of the plurality of relationships;
receive an indication to execute the software component to perform the one or more operations; and
execute the software component to perform the one or more operations with the data of the building component based on the software component entity related to the building component entity indicated by the building entity database in response to receiving the indication.

2. The building system of claim 1, wherein the plurality of relationships semantically define types of relationships between the plurality of entities.

3. The building system of claim 1, wherein an operational command entity of the plurality of entities is an operational command of the building component, the operational command entity and the building component entity related by one or more particular relationships of the plurality of relationships;
wherein the instructions cause the one or more processors to:
receive a command indication to perform the operational command for the building component; and
operate the building component based on the operational command entity related to the building component entity in response to receiving the command indication to perform the operational command.

4. The building system of claim 1, wherein the instructions cause the one or more processors to:
receive a plurality of events from the building component of the building;
generate a plurality of event data entities for the plurality of events; and
add the plurality of event data entities to the building entity database and one or more relationships between the plurality of event data entities and the building component entity.

5. The building system of claim 4, wherein the plurality of events include a value generated by the building component and a time indication of a time at which the value was generated.

6. The building system of claim 4, wherein the software component is a processing workflow that defines one or more processing operations that generate derived data using the plurality of events;
wherein the instructions cause the one or more processors to:
execute the one or more processing operations to generate the derived data;
identify a data entity from a relationship of the plurality of relationships between the data entity and the building component entity; and
store the derived data in the data entity.

7. The building system of claim 1, wherein the software component is an analytic operator that performs one or more logic operations on the data of the building component.

8. The building system of claim 7, wherein the software component is at least one of:
a daily average operator that generates a daily average of temperature data of the building component; or an abnormal indoor temperature operator that identifies an abnormal temperature measurement of the temperature data of the building component.

9. The building system of claim 7, wherein the plurality of entities include a data entity representing the data of the building component;
wherein the plurality of relationships include a relationship between the data entity and the software component entity indicating that the software component performs the one or more logic operations on the data.

10. The building system of claim 1, wherein the building entity database is a graph database including a plurality of nodes representing the plurality of entities and a plurality of edges representing the plurality of relationships.

11. A method of a building comprising:
storing, by a processing circuit, a plurality of entities and a plurality of relationships between the plurality of entities in a building entity database, wherein a building component entity of the plurality of entities represents a building component of the building, wherein a software component entity of the plurality of entities provides a virtual representation of a software component that is stored, and executes outside of, the building entity database, the software component performs one or more operations with data of the building component, the software component entity related to the building component entity by one or more of the plurality of relationships;
receiving, by the processing circuit, an indication to execute the software component to perform the one or more operations; and
executing, by the processing circuit, the software component to perform the one or more operations with the data of the building component based on the software component entity related to the building component entity indicated by the building entity database in response to receiving the indication.

12. The method of claim 11, wherein the plurality of relationships semantically define types of relationships between the plurality of entities.

13. The method of claim 11, wherein an operational command entity of the plurality of entities is an operational command of the building component, the operational command entity and the building component entity related by one or more particular relationships of the plurality of relationships;
wherein the method further comprises:
receiving, by the processing circuit, a command indication to perform the operational command for the building component; and
operating, by the processing circuit, the building component based on the operational command entity related to the building component entity in response to receiving the command indication to perform the operational command.

14. The method of claim 11, further comprising:
receiving, by the processing circuit, a plurality of events from the building component of the building;
generating, by the processing circuit, a plurality of event data entities for the plurality of events; and
adding, by the processing circuit, the plurality of event data entities to the building entity database and one or more relationships between the plurality of event data entities and the building component entity.

15. The method of claim 14, wherein the plurality of events include a value generated by the building component and a time indication of a time at which the value was generated.

16. The method of claim 14, wherein the software component is a processing workflow that defines one or more processing operations that generate derived data using the plurality of events;
wherein the method further comprises:
executing, by the processing circuit, the one or more processing operations to generate the derived data;
identifying, by the processing circuit, a data entity from a relationship of the plurality of relationships between the data entity and the building component entity; and
storing, by the processing circuit, the derived data in the data entity.

17. The method of claim 11, wherein the software component is an analytic operator that performs one or more logic operations on the data of the building component.

18. The method of claim 17, wherein the software component is at least one of:
a daily average operator that generates a daily average of temperature data of the building component; or
an abnormal indoor temperature operator that identifies an abnormal temperature measurement of the temperature data of the building component.

19. The method of claim 17, wherein the plurality of entities include a data entity representing the data of the building component;
wherein the plurality of relationships include a relationship between the data entity and the software component entity indicating that the software component performs the one or more logic operations on the data.

20. A building system of a building comprising:
one or more storage devices storing instructions thereon; and
one or more processors that execute the instructions causing the one or more processors to:
store a plurality of entities and a plurality of relationships between the plurality of entities in a building entity database, wherein a building component entity of the plurality of entities represents a building component of the building, wherein a software component entity of the plurality of entities provides a virtual representation of a software component that is stored, and executes outside of, the building entity database, the software component performs one or more operations with data of the building component, the software component entity related to the building component entity by one or more of the plurality of relationships;
receive an indication to execute the software component to perform the one or more operations; and
execute the software component to perform the one or more operations with the data of the building component based on the software component entity related to the building component entity indicated by the building entity database in response to receiving the indication.

21. The building system of claim 20, wherein the software component is a processing workflow that defines one or more processing operations that generate derived data using a plurality of events;
wherein the instructions cause the one or more processors to:

execute the one or more processing operations to generate the derived data;
identify a data entity from a relationship of the plurality of relationships between the data entity and the building component entity; and
store the derived data in the data entity.

\* \* \* \* \*

UNITED STATES PATENT AND TRADEMARK OFFICE
CERTIFICATE OF CORRECTION

PATENT NO. : 11,151,983 B2
APPLICATION NO. : 17/105263
DATED : October 19, 2021
INVENTOR(S) : Youngchoon Park et al.

It is certified that error appears in the above-identified patent and that said Letters Patent is hereby corrected as shown below:

On the Title Page

Item (63), and In the Specification, Column 1, Lines 7-30, should read:
This application is a continuation of U.S. Patent Application No. 16/723,600 filed December 20th, 2019 which is a continuation of U.S. Patent Application No. 16/143,243 filed September 26th, 2018 which claims the benefit of and priority to U.S. Provisional Patent Application No. 62/564,247 filed September 27, 2017, U.S. Provisional Patent Application No. 62/611,974 filed December 29, 2017, and U.S. Provisional Patent Application No. 62/611,984 filed December 29, 2017. U.S. Patent Application No. 16/143,243 filed September 26th, 2018 is a continuation-in-part of U.S. Patent Application No. 15/644,519 filed July 7, 2017, which claims the benefit of and priority to U.S. Provisional Patent Application No. 62/457,654 filed February 10, 2017. U.S. Patent Application No. 16/143,243 filed September 26th, 2018 is also a continuation-in-part of U.S. Patent Application No. 15/644,581 filed July 7, 2017, which claims the benefit of and priority to U.S. Provisional Patent Application No. 62/457,654 filed February 10, 2017. U.S. Patent Application No. 16/143,243 filed September 26th, 2018 is also a continuation-in-part of U.S. Patent Application No. 15/644,560 filed July 7, 2017, which claims the benefit of and priority to U.S. Provisional Patent Application No. 62/457,654 filed February 10, 2017. The entire disclosure of each of these patent applications is incorporated by reference herein.

Signed and Sealed this
Ninth Day of August, 2022

Katherine Kelly Vidal
*Director of the United States Patent and Trademark Office*